(12) United States Patent
Sampath et al.

(10) Patent No.: US 11,368,926 B2
(45) Date of Patent: Jun. 21, 2022

(54) REPORTING POWER LIMIT AND CORRESPONDING CONSTRAINT

(71) Applicant: QUALCOMM Incorporated, San Diego, CA (US)

(72) Inventors: Ashwin Sampath, Skillman, NJ (US); Andrzej Partyka, Bedminster, NJ (US); Joseph Burke, Glenview, IL (US); Ozge Koymen, Princeton, NJ (US); Raghu Challa, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 412 days.

(21) Appl. No.: 15/837,607

(22) Filed: Dec. 11, 2017

(65) Prior Publication Data

US 2018/0167897 A1  Jun. 14, 2018

Related U.S. Application Data

(60) Provisional application No. 62/432,956, filed on Dec. 12, 2016.

(51) Int. Cl.
*H04W 52/36* (2009.01)
*H04W 72/12* (2009.01)
*H04B 7/06* (2006.01)

(52) U.S. Cl.
CPC ....... *H04W 52/365* (2013.01); *H04W 52/367* (2013.01); *H04W 72/1205* (2013.01); *H04B 7/0617* (2013.01)

(58) Field of Classification Search
None
See application file for complete search history.

(56) References Cited

U.S. PATENT DOCUMENTS

| 7,920,027 B2 | 4/2011 | Keerti |
| 8,538,351 B2 * | 9/2013 | Wilson ................ H04W 52/146 455/127.1 |

(Continued)

FOREIGN PATENT DOCUMENTS

| CN | 104105191 A | 10/2014 |
| CN | 105359420 A | 2/2016 |

(Continued)

OTHER PUBLICATIONS

International Search Report and Written Opinion—PCT/US2017/065765—ISA/EPO—Mar. 29, 2018.
Taiwan Search Report—TW106143510—TIPO—dated Apr. 18, 2021.

*Primary Examiner* — Jeffrey M Rutkowski
*Assistant Examiner* — Ning Li

(57) ABSTRACT

Various aspects of the disclosure relate to reporting a power limit along with an indication of at least one constraint upon which the power limit is based. In some aspects, the constraint is a radio frequency (RF) exposure constraint. For example, a power headroom limit calculated by a first apparatus may be constrained by a specific absorption rate (SAR) limit or a maximum permissible exposure (MPE) limit. The first apparatus may thus report to a second apparatus the current power headroom limit of the first apparatus along with an indication of whether the power headroom limit is constrained by an SAR limit or an MPE limit (e.g., as opposed to being constrained by a maximum transmit power limit). The second apparatus may then schedule the first apparatus taking into account the power headroom limit and the corresponding constraint (e.g., maximum power or SAR/MPE).

28 Claims, 22 Drawing Sheets

(56) References Cited

U.S. PATENT DOCUMENTS

| | | |
|---|---|---|
| 8,565,205 B2 | 10/2013 | Ho et al. |
| 8,737,934 B2 | 5/2014 | Calvarese et al. |
| 9,426,754 B2 | 8/2016 | Steer et al. |
| 9,813,997 B2 | 11/2017 | Mercer et al. |
| 2005/0012657 A1* | 1/2005 | Mohan .................. G01S 7/025 342/133 |
| 2007/0105582 A1* | 5/2007 | McCorkle ............. H04W 52/38 455/522 |
| 2008/0037464 A1* | 2/2008 | Lim ..................... H04W 72/085 370/329 |
| 2008/0139236 A1* | 6/2008 | Barrett ................ H04W 52/225 455/522 |
| 2009/0285158 A1* | 11/2009 | Rezaiifar ............. H04W 52/241 370/328 |
| 2011/0210892 A1 | 9/2011 | Shany et al. |
| 2011/0222469 A1 | 9/2011 | Ali et al. |
| 2012/0021707 A1* | 1/2012 | Forrester .............. H04W 52/30 455/103 |
| 2012/0207112 A1* | 8/2012 | Kim .................... H04W 52/146 370/329 |
| 2013/0121203 A1* | 5/2013 | Jung .................... H04W 52/30 370/252 |
| 2013/0300941 A1* | 11/2013 | Katie .................. H04L 27/0006 348/725 |
| 2013/0301536 A1* | 11/2013 | Park ..................... H04W 24/10 370/328 |
| 2014/0088379 A1* | 3/2014 | Irazoqui ................ A61B 5/076 600/302 |
| 2014/0200003 A1* | 7/2014 | Kodali ................. H04W 36/30 455/436 |
| 2014/0213192 A1 | 7/2014 | Lagnado |
| 2014/0370929 A1* | 12/2014 | Khawand ............. H04B 1/3838 455/522 |
| 2015/0011236 A1* | 1/2015 | Kazmi .................. H04B 17/27 455/456.1 |
| 2015/0071239 A1* | 3/2015 | Zhang ................. H04L 1/0006 370/329 |
| 2015/0131452 A1* | 5/2015 | Choi ................ H04W 72/0446 370/241 |
| 2015/0139080 A1* | 5/2015 | Ellenbeck ................ H04L 1/00 370/329 |
| 2015/0162942 A1* | 6/2015 | Bolin ................ H04W 28/0221 370/252 |
| 2015/0341869 A1* | 11/2015 | Sen ....................... H04W 52/34 455/522 |
| 2015/0379387 A1* | 12/2015 | Richley .............. G06K 19/0702 235/492 |
| 2016/0073326 A1* | 3/2016 | Vannithamby et al. ..................... H04W 48/12 370/312 |
| 2016/0128001 A1* | 5/2016 | Tsuda .................... H04W 16/32 370/329 |
| 2016/0262171 A1* | 9/2016 | Tejedor .............. H04W 72/1226 |
| 2016/0330698 A1* | 11/2016 | Loehr ..................... H04W 4/70 |
| 2016/0365886 A1* | 12/2016 | Prendergast ........ H04W 52/367 |
| 2017/0078978 A1* | 3/2017 | Scipione ............... H04W 52/18 |
| 2017/0181105 A1* | 6/2017 | John ................... H04W 52/283 |
| 2017/0279727 A1* | 9/2017 | Kodali .............. H04W 28/0236 |
| 2018/0007643 A1* | 1/2018 | Tiirola ................ H04W 52/241 |
| 2019/0074889 A1* | 3/2019 | Colombi ............... H01Q 1/245 |
| 2019/0116558 A1* | 4/2019 | Bontu ................. H04W 52/143 |
| 2020/0145079 A1* | 5/2020 | Marinier .............. H04B 7/0456 |

FOREIGN PATENT DOCUMENTS

| | | |
|---|---|---|
| CN | 105379339 A | 3/2016 |
| WO | WO-2009126392 A1 | 10/2009 |
| WO | 2012061582 A1 | 5/2012 |

* cited by examiner

REPORTING POWER LIMIT AND CORRESPONDING CONSTRAINT

CROSS-REFERENCE TO RELATED APPLICATION(S)

This application claims priority to and the benefit of provisional patent application No. 62/432,956 filed in the U.S. Patent and Trademark Office on Dec. 12, 2016, the entire content of which is incorporated herein by reference.

INTRODUCTION

Various aspects described herein relate to wireless communication and, more particularly but not exclusively, to reporting a power limit along with an indication of at least one constraint upon which the power limit is based.

In some wireless communication systems, a wireless communication device may use beamforming to communicate with another device or other devices. To send and/or receive a beamformed signal, a device may be equipped with an antenna subarray, a microwave lens, multiple transmit antennas, multiple receive antennas, or a combination thereof. One example is a millimeter wave (mmW) system where multiple antennas are used for beamforming (e.g., in the range of 30 GHz, 60 GHz, etc.). For example, a base station may use beamforming to communicate with different devices served by the access point. Often, the beamforming directions to these two devices are distinct. Consequently, the base station may use a first beam configuration to communicate with a first device and use a second beam configuration to communicate with a second device. In some scenarios, this communication may take place in a time-division-multiplexing (TDM) or time-division-duplexing (TDD) manner That is, the base station transmits to the first device in a first time interval and transmits to the second device subsequently in a second time interval.

FIG. 1 illustrates an example of a communication system 100 where a mmW base station (BS) 102 communicates with a first mmW user equipment (UE) 104 and a second mmW UE 106 via different beamforming directions. As indicated by a set of beams 108, the mmW base station 102 may communicate via any one of a plurality of directional beams. As indicated by a set of beams 110, the first mmW UE 104 may communicate via any one of a plurality of directional beams. As indicated by a set of beams 112, the second mmW UE 106 may communicate via any one of a plurality of directional beams. For example, the base station 102 may communicate with the first mmW UE 104 via a first beamforming direction 114 and communicate with the second mmW UE 106 via a second beamforming direction 116.

The Federal Communications Commission (FCC) and International Commission on Non-Ionizing Radiation Protection (ICNIRP) impose exposure limits on radio frequency (RF) radiation from wireless devices. The limits are specified as a specific absorption rate (SAR) for sub-6 GHz bands (power per unit volume), and as a maximum permissible exposure (MPE) for above 6 GHz bands (power per unit area). For a user equipment (UE) or mmW base station (BS), averaging using a "duty-cycle" may be allowed.

Free space losses and other losses for systems that use millimeter (mmW) bands may be much higher than the losses for sub-6 GHz systems. Thus, a higher effective isotropic radiated power (EIRP) for transmissions is generally desired for operation in mmW bands. This is typically accomplished by using one or more antenna arrays to steer the beam in the desired direction. In these systems, a single antenna radiator could fail MPE limits, or if a beam of a handheld device is pointed towards the body or skin of a person (or some other object subject to protection), the MPE limit could be exceeded. Also, for systems that communicate via mmW and sub-6 GHz bands, SAR limits and/or MPE limits could be exceeded.

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

In some aspects, the disclosure provides an apparatus configured for communication that includes a memory device and a processing circuit coupled to the memory device. The processing circuit is configured to: determine a transmit power limit for the apparatus; generate an indication of whether the transmit power limit is constrained by a radio frequency (RF) exposure limit; and send the transmit power limit and the indication to a second apparatus.

In some aspects, the disclosure provides a method for communication including: determining a transmit power limit for a first apparatus; generating an indication of whether the transmit power limit is constrained by a radio frequency (RF) exposure limit; and sending the transmit power limit and the indication to a second apparatus.

In some aspects, the disclosure provides an apparatus configured for communication. The apparatus including: means for determining a transmit power limit for the apparatus; means for generating an indication of whether the transmit power limit is constrained by a radio frequency (RF) exposure limit; and means for sending the transmit power limit and the indication to a second apparatus.

In some aspects, the disclosure provides a non-transitory computer-readable medium storing computer-executable code, including code to: determine a transmit power limit for a first apparatus; generate an indication of whether the transmit power limit is constrained by a radio frequency (RF) exposure limit; and send the transmit power limit and the indication to a second apparatus.

In some aspects, the disclosure provides an apparatus configured for communication that includes a memory device and a processing circuit coupled to the memory device. The processing circuit is configured to: receive a transmit power limit for a second apparatus and an indication of whether the transmit power limit is constrained by a radio frequency (RF) exposure limit; and schedule the second apparatus based on the transmit power limit and the indication.

In some aspects, the disclosure provides a method for communication for a first apparatus including: receiving a transmit power limit for a second apparatus and an indication of whether the transmit power limit is constrained by a radio frequency (RF) exposure limit; and scheduling the second apparatus based on the transmit power limit and the indication.

In some aspects, the disclosure provides an apparatus configured for communication. The apparatus including: means for receiving a transmit power limit for a second apparatus and an indication of whether the transmit power limit is constrained by a radio frequency (RF) exposure limit; and means for scheduling the second apparatus based on the transmit power limit and the indication.

In some aspects, the disclosure provides a non-transitory computer-readable medium storing computer-executable code for a first apparatus, including code to: receive a transmit power limit for a second apparatus and an indication of whether the transmit power limit is constrained by a radio frequency (RF) exposure limit; and schedule the second apparatus based on the transmit power limit and the indication.

These and other aspects of the disclosure will become more fully understood upon a review of the detailed description, which follows. Other aspects, features, and implementations of the disclosure will become apparent to those of ordinary skill in the art, upon reviewing the following description of specific implementations of the disclosure in conjunction with the accompanying figures. While features of the disclosure may be discussed relative to certain implementations and figures below, all implementations of the disclosure can include one or more of the advantageous features discussed herein. In other words, while one or more implementations may be discussed as having certain advantageous features, one or more of such features may also be used in accordance with the various implementations of the disclosure discussed herein. In similar fashion, while certain implementations may be discussed below as device, system, or method implementations it should be understood that such implementations can be implemented in various devices, systems, and methods.

BRIEF DESCRIPTION OF THE DRAWINGS

The accompanying drawings are presented to aid in the description of aspects of the disclosure and are provided solely for illustration of the aspects and not limitations thereof.

DETAILED DESCRIPTION

Figure 1:
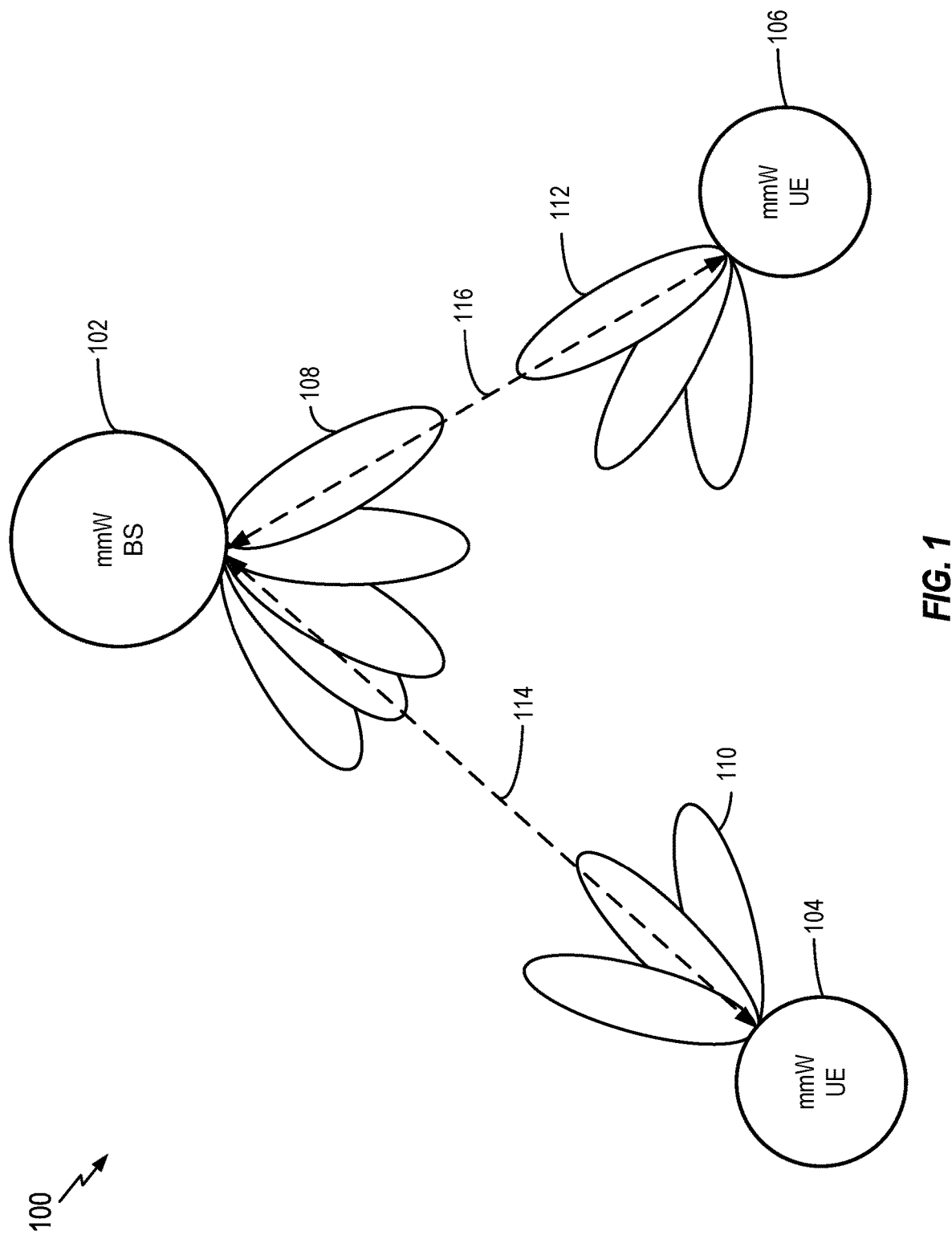
FIG. 1 illustrates an example communication system employing beamforming within which aspects of the disclosure may be implemented.

Various aspects of the disclosure relate to reporting a power limit along with an indication of at least one constraint upon which the power limit is based. In some aspects, the constraint is a radio frequency (RF) exposure constraint. For example, a power headroom limit calculated by a first apparatus (e.g., a user equipment or a customer premises equipment) may, under some circumstances, be constrained by a specific absorption rate (SAR) limit or a maximum permissible exposure (MPE) limit. The first apparatus may thus report to a second apparatus (e.g., a transmit receive point such as an eNode B) the current power headroom limit of the first apparatus along with an indication of whether the power headroom limit is constrained by an SAR limit or an MPE limit (e.g., as opposed to being constrained by a maximum transmit power limit). The second apparatus may then schedule the first apparatus accordingly. For example, if the power headroom limit is SAR or MPE constrained, the second apparatus may lower the average or instantaneous transmit power and/or take duty cycling into account to determine how to schedule the first apparatus (e.g., which modulation and coding scheme (MCS) to use and how to conduct power control). Conversely, if the power headroom limit is not SAR or MPE constrained, the second apparatus may schedule the first apparatus in a manner to ensure that the power headroom limit is not exceeded, even instantaneously. These and other aspects of the disclosure may be applicable to, for example, mmW communication systems and/or sub-6 GHz communication systems (e.g., single band systems, dual band systems, and multi-band systems) and/or other types of communication systems.

Aspects of the disclosure are described in the following description and related drawings directed to specific examples. Alternate examples may be devised without departing from the scope of the disclosure. Additionally, well-known elements will not be described in detail or will be omitted so as not to obscure the relevant details of the disclosure. The teachings herein can be implemented according to various network technologies including, without limitation, fifth generation (5G) technology, fourth generation (4G) technology, third generation (3G) technology, and other network architectures. Thus, various aspects of the disclosure may be extended to networks based on 3rd Generation Partnership Project (3GPP) Long Term Evolution (LTE), LTE-Advanced (LTE-A) (in FDD, TDD, or both modes), Universal Mobile Telecommunications System (UMTS), Global System for Mobile Communications (GSM), Code Division Multiple Access (CDMA), Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system. For purposes of illustration, the following may describe various aspects in the context of a 5G system and/or an LTE system. It should be appreciated, however, that the teachings herein may be employed in other systems as well. Thus, references to functionality in the context of 5G and/or LTE terminology should be understood to be equally applicable to other types of technology, networks, components, signaling, and so on.

The Federal Communications Commission (FCC) imposes exposure limits to radio frequency (RF) radiation from wireless devices. For sub-6 GHz bands, this is specified as a specific absorption rate (SAR) and for above 6 GHz bands, as a maximum permissible exposure (MPE). It is understood that the higher frequencies tend to interact with the skin surface while the lower frequencies tend to be absorbed in the skin volume. Therefore, the SAR is expressed as power per unit volume, while the MPE is expressed as power per unit area. Specifically, the FCC MPE limit of concern for millimeter wave systems is 1 mW/cm$\hat{0}$2. The International Commission on Non-Ionizing Radiation Protection (ICNIRP) limit, is 20 mW/20 cm$\hat{0}$2. The ICNIRP limit is less stringent than the FCC limit because the power density can be met over a wider area. Additionally, for a UE or other devices (e.g., base stations), averaging using a "duty-cycle" is allowed.

Since free space losses and other losses for mmW systems may be much higher than the losses for sub-6 GHz systems, a higher effective isotropic radiated power (EIRP) for transmissions is generally desired. This is typically accomplished by using antenna arrays to steer the beam in the desired direction. The current EIRP limit from the FCC for UE-class devices in mmW systems (e.g., 24 GHz-60 GHz) is 43 dBm and for "transportable" class devices (e.g., customer premises equipment (CPE) used in the home) the EIRP limit is 55 dBm. While a typical UE (e.g., a smartphone, a tablet, etc.) design may practically operate at much lower than 43 dBm (e.g. 26-30 dBm), there may still be a problem that, at those power levels, a beam pointed towards the body/skin of a person (or some other object subject to protection) by handheld device could violate the MPE limits. For example, with FCC limits and 35 dBm EIRP, the MPE limit may be violated up to distance of 15 centimeters (cm) from the antenna array. Thus, static rules for conformance could lead to severely limiting the value of these bands.

Figure 2:
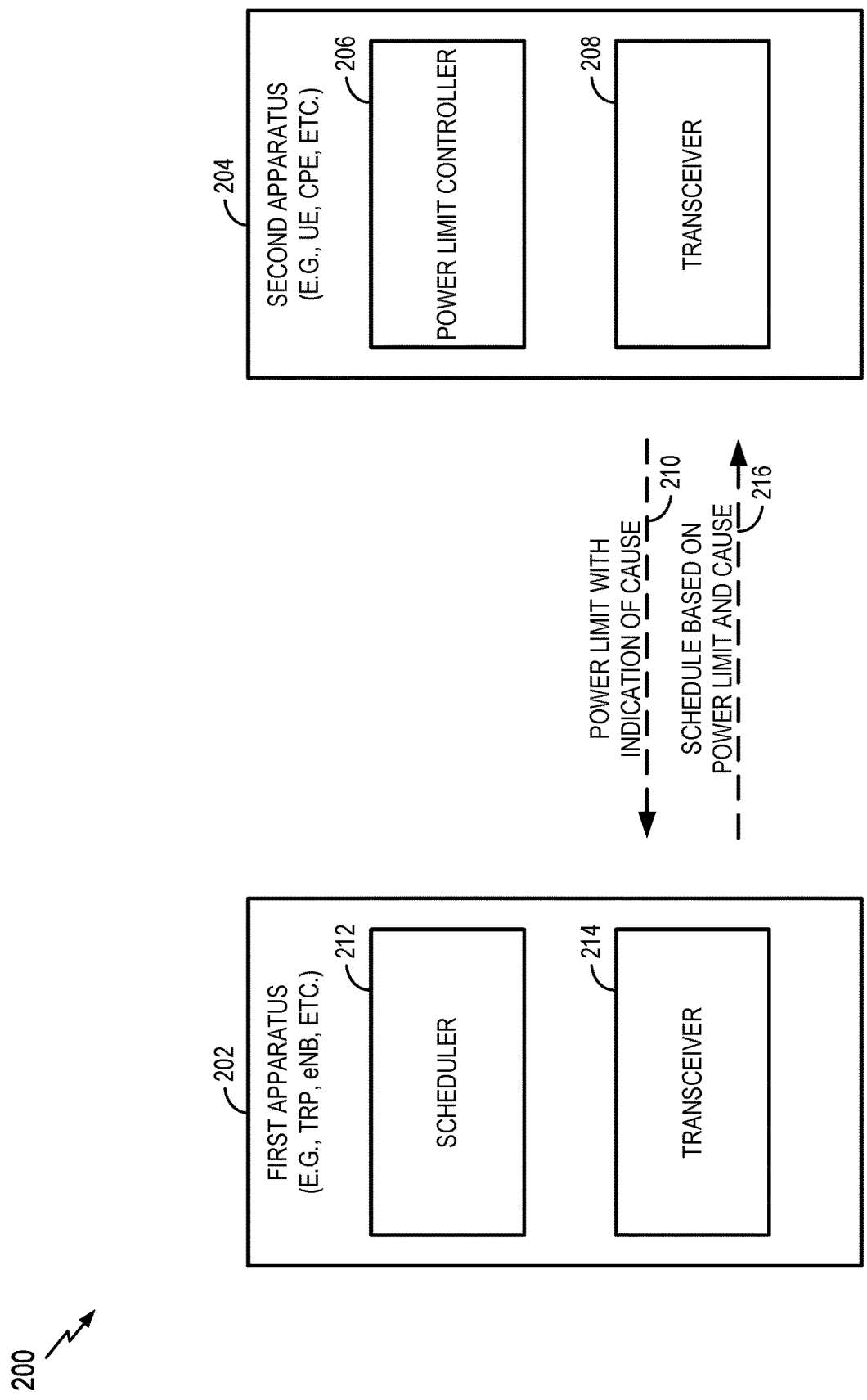
FIG. 2 illustrates an example communication system that uses power limit reporting in accordance with some aspects of the disclosure.

FIG. 2 illustrates a communication system 200 that includes a first apparatus 202 (e.g., a transmit receive point, an eNode B, etc.) and a second apparatus 204 (e.g., a UE, a CPE, etc.). The first apparatus 202 and the second apparatus 204 may correspond to, for example, the mmW BS 102 and/or the mmW UEs 104 and 106 of FIG. 1.

The second apparatus 204 includes a power limit controller 206 for determining a power limit that may be constrained due to a particular cause (e.g., an RF exposure limit and/or a maximum transmit power). A transceiver 208 of the second apparatus 204 sends a message 210 including the power limit and an indication of the cause to the first apparatus 202.

Upon receipt of the message 210 by a transceiver 214 of the first apparatus 202, a scheduler 212 of the first apparatus 202 schedules the second apparatus 204 based on the power limit and the cause. For example, the scheduler 212 may schedule the second apparatus 204 according to an average power if the cause for the power limit is an RF exposure constraint. Alternatively, the scheduler 212 may schedule the second apparatus 204 according to a maximum power limit if the cause for the power limit is a maximum transmit power constraint.

In either case, the scheduler 212 uses the transceiver 214 to send a message 216 including a schedule that is based on the applicable power limit and cause to the second apparatus 204. Upon receipt of the message 216 by the transceiver 208, the second apparatus 204 will transmit according to the schedule.

In some aspects, a TRP may refer to a physical entity that incorporates radio head functionality for a particular physical cell. In some aspects, the TRP may include 5G new radio (NR) functionality with an air interface based on orthogonal frequency division multiplexing (OFDM). NR may support, for example and without limitation, enhanced mobile broadband (eMBB), mission-critical services, and wide-scale deployment of Internet of Things (IoT) devices. This functionality may be similar in one or more aspects to (or incorporated into) the functionality of a cellular IoT (CIoT) base station (C-BS), a NodeB (NB), an enhanced NodeB (eNB) a gigabit NodeB (gNB), a radio network controller (RNC), a base station (BS), a radio base station (RBS), a base station controller (BSC), a base transceiver station (BTS), a transceiver function (TF), a radio transceiver, a radio router, a basic service set (BSS), an extended service set (ESS), a macro cell, a macro node, a Home eNB (HeNB), a femto cell, a femto node, a pico node, or some other similar entity. In different scenarios (e.g., NR, LTE, etc.), a TRP may be referred to as a gNodeB (gNB), an eNB, a base station, or referenced using other terminology.

Figure 3:
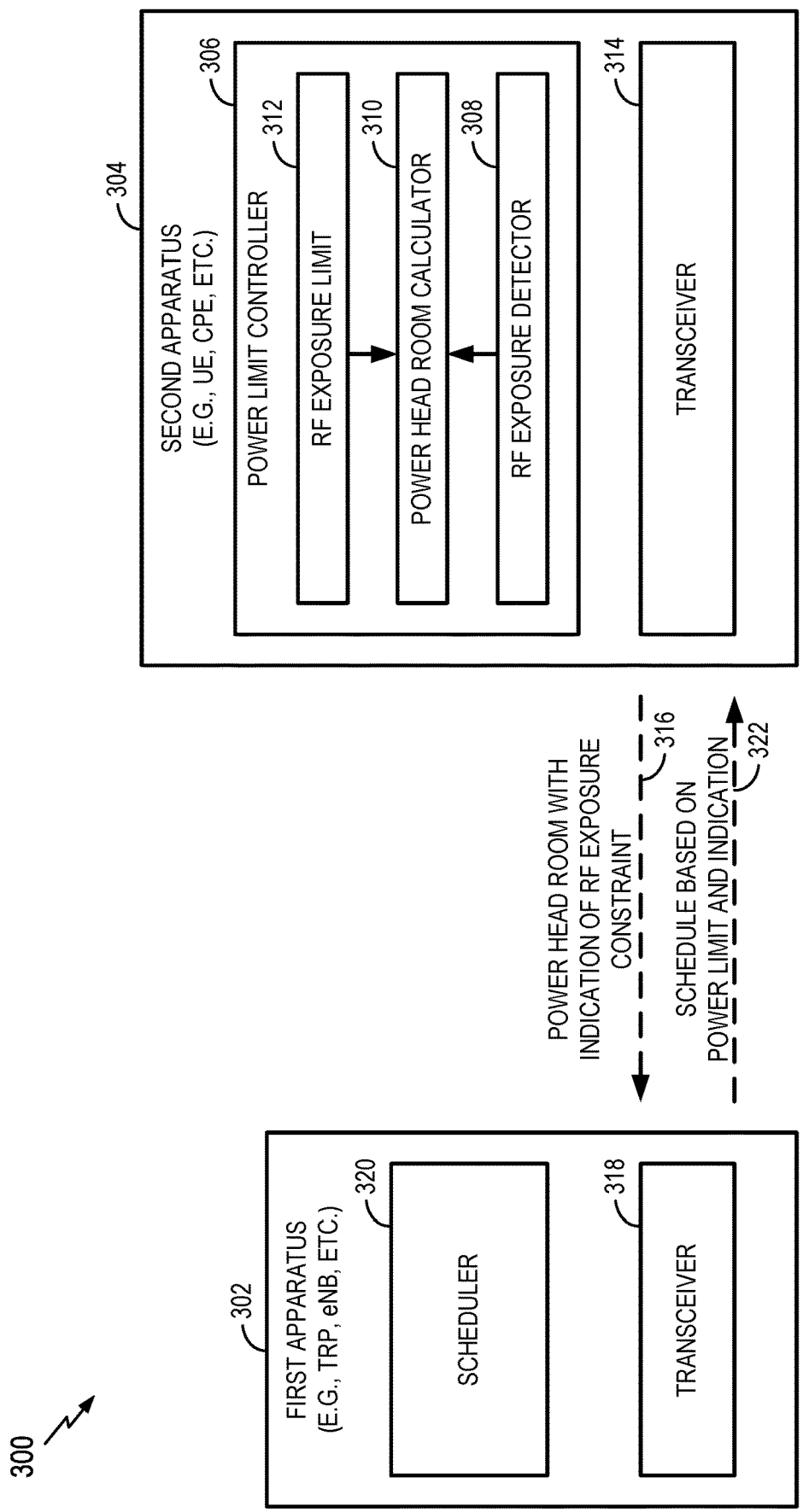
FIG. 3 illustrates another example communication system that uses power limit reporting in accordance with some aspects of the disclosure.

FIG. 3 illustrates a more specific example of the communication system 200 of FIG. 2. In FIG. 3, a communication system 300 includes a first apparatus 302 (e.g., a transmit receive point, an eNode B, etc.) and a second apparatus 304 (e.g., a UE or a CPE). The first apparatus 302 may correspond to, for example, the mmW BS 102 of FIG. 1 and/or the first apparatus 202 of FIG. 2. The second apparatus 304 may correspond to, for example, the mmW UEs 104 and 106 of FIG. 1 and/or the second apparatus 204 of FIG. 2.

The second apparatus 304 includes a power limit controller 306 for determining a power head room that may be constrained due to an RF exposure constraint or some other cause (e.g., a maximum transmit power constraint). To this end, the power limit controller 306 includes an RF exposure detector 308 that determines the extent to which a particular beam configuration may impact an object subject to protection (e.g., a person). A power headroom calculator 310 determines the power head room based on the results of the exposure detection and an RF exposure limit 312. A transceiver 314 of the second apparatus 304 sends a message 316 including the power head room and an indication of whether the power head room is constrained by an RF exposure constraint to the first apparatus 302.

Upon receipt of the message 316 by a transceiver 318 of the first apparatus 302, a scheduler 320 of the first apparatus 302 schedules the second apparatus 304 based on the power limit and the indication. For example, the scheduler 320 may schedule 322 the second apparatus 304 according to an average power if the power head room is constrained by an RF exposure constraint or the scheduler 320 may schedule 322 the second apparatus 304 according to a maximum power limit if the power head room is constrained by a maximum transmit power constraint.

Managing Maximum Permissible Exposure

The disclosure relates in some aspects to a user (e.g., a UE or CPE) engaging a network (e.g., a TRP, an eNode, etc.) in dynamically managing MPE (or other) compliance at the user through the network's scheduling decisions. For example, an exposure requirement can be met in a time-window by reducing transmit power (e.g., average transmit power or instantaneous transmit power) and/or by averaging over the duty cycle of a UE's transmissions. In some implementations, the fraction of time and the power levels at which the UE transmits may be controlled (e.g., fully or partially controlled) by the network's scheduling decisions.

In some communication systems (e.g., LTE), the time division duplex (TDD) configuration typically determines the fraction of sub-frames in a 10 ms window that are allocated for downlink (DL) communication versus uplink (UL) communication. An additional duty cycle as a fraction of the UL sub-frames in which a particular UE is scheduled determines the final fraction of transmission time that is allocated for that UE. In some communication systems (e.g., 5G), dynamic TDD may be used. For example, even for one cell, the DL/UL subframes may be dynamically determined without any radio resource control (RRC) signaling for notification. This implies that a UE might not be able to compute its worst-case duty-cycle based on learning the DL/UL configuration from a broadcast system information block (SIB) since the DL/UL configuration is dynamic in this case.

In some communication systems (e.g., LTE), the UE reports power head room (PHR) to the network to support uplink scheduling. However, in these communication systems, the UE does not provide an indication of whether an MPE (or SAR) constraint or a maximum power limit (e.g., due to RF constraints) is causing that report. The network, by default, will not schedule the UE with modulation and coding schemes (MCSs) that exceed the PHR because the default assumption is that peak power (and sometimes interference to neighbors) is the constraint.

The disclosure relates in some aspects to making the network aware of the reason for the reported PHR so that the network can respond differently based on the constraint. For example, if the PHR limit is due to the UE approaching peak power, the network generally would not schedule the user at MCS values that exceed the peak power, as that would cause loss in performance and consequently, an inefficient of use of resources. However, if the PHR limit is due to an MPE constraint, the network does not have to necessarily conform to the limit immediately. Instead, the network can schedule the UE so that the average power computed over a window is used in determining whether the PHR limit is being met.

Example Average Power Considerations

The average power computed over the window could, for example, account for one or more of UL/DL splits, dynamic resource sharing, MCS selection, or duty cycling. These techniques will be discussed in turn.

The network may dynamically decide splits between DL and UL allocations. For example, only 1 of 10 slots in an averaging window may be allocated as UL slots. In this case, the relevant comparison for the average power computation can be to check if 10 dB lower than the actual power exceeds the MPE limit.

The network may schedule dynamic resource sharing on the UL amongst multiple users. For example, the UL/DL split may be $\frac{1}{10}$ and a particular user may be allocated $\frac{1}{4}$ of the UL slots. In this case, the average of interest may be 16 dB lower than the actual transmit power. Thus, this lower value can be compared to the MPE limit.

An average power computation may involve selecting an MCS that is lower than what the channel allows, but that still lowers power accordingly. For example, if the network deems that the duty cycle from the UL/DL splits and the dynamic resource sharing discussed above still causes a violation of the MPE limit, the network can keep the user transmitting at a lower power and corresponding lower MCS. The network can pick MCS values above a PHR limit that is based on the MPE limit but below a PHR that is based on the peak power limit, in conjunction with the duty cycle, to ensure MPE conformance. Thus, the network may appropriately tradeoff MPE conformance and performance.

An average power computation may involve duty cycling through the use of a lower-frequency anchor. In some scenarios, mmW systems may be deployed alongside a lower-frequency anchor (e.g., to a sub-6 GHz band macro base station) such that the network can time share across the two radios (e.g., the mmW radio and the lower-frequency radio). Thus, the network may appropriately tradeoff MPE conformance and performance and SAR conformance and performance Other Techniques for Managing Maximum Permissible Exposure Other techniques that the network could use if it is made aware of MPE limits being reached at the UE/CPE include selecting preferred beam combinations and/or using proximity detection. These techniques will be discussed in turn.

The network may elect to use beam combinations that may be worse from the channel quality perspective but are less impeded (e.g., unimpeded) and/or are less MPE constrained (e.g., not MPE constrained). In some aspects, this may involve directional proximity sensing at the user and reporting of MPE information (e.g., associated with at least one beam of a UE and/or at least one sub-array of a UE).

The network may elect to use the proximity detection capability of the UE/CPE to determine the average EIRP limit to which the network needs to manage. For example, the detection range needed may be determined given the maximum EIRP. This can equivalently be posed as the EIRP allowed given the maximum detection range. Thus, the UE/CPE could report that EIRP to the network.

Other Aspects

The disclosure relates in some aspects to managing MPE limits at a UE or CPE wherein a UE feeds back to the network the power headroom with an indication that the constraint stems from MPE. A variant of this is to provide this feedback on a per UE sub-array basis or per UE beam basis.

The disclosure relates in some aspects to a UE feeding-back the proximity detection range capability of the UE to the network. In this case, if the range is relatively low, the network may elect to limit the UE's transmit power (e.g., by controlling the scheduled MCS, etc.)

The disclosure relates in some aspects to the network factoring in the above feedback (e.g., network power headroom with the indication and/or proximity detection range capability) in making scheduling decisions that control at least one of the duty cycle of transmissions (e.g., including switching to a lower frequency), beam choices, transmit power levels, MCS levels, or any combination thereof.

The disclosure relates in some aspects to a UE keeping track of its average transmit power (over a period of time) and reporting this back to the network. Thus, in this case, the network need not perform the task of averaging the transmit power of the UE.

The disclosure relates in some aspects to the network (e.g., a TRP or eNB) lowering the maximum transmission power of a UE or CPE by signaling Additional Maximum Power Reduction (A-MPR) to the UE or CPE. By using this mechanism, the MPE may be reduced without throttling down the UL duty cycle. To address any increase in path loss that may occur due to the use of A-MPR, the network could adopt mechanisms to enhance coverage. Such mechanisms include, without limitation, lowering the MCS, reducing the resource block (RB) size, increasing repetitions in the time domain, or transmission time interval (TTI) bundling.

Thus, the disclosure relates in some aspects to the network triggering an A-MPR suitable to allow a UE or CPE to meet a target MPE. In addition, the network may trigger coverage enhancement capabilities on the UL (e.g., similar to eMTC) allowing, for example, longer repetitions, smaller allocations, longer hybrid automatic repeat request (HARQ), longer demodulation reference signal (DMRS), or any combination thereof.

First Example Apparatus

Figure 4:
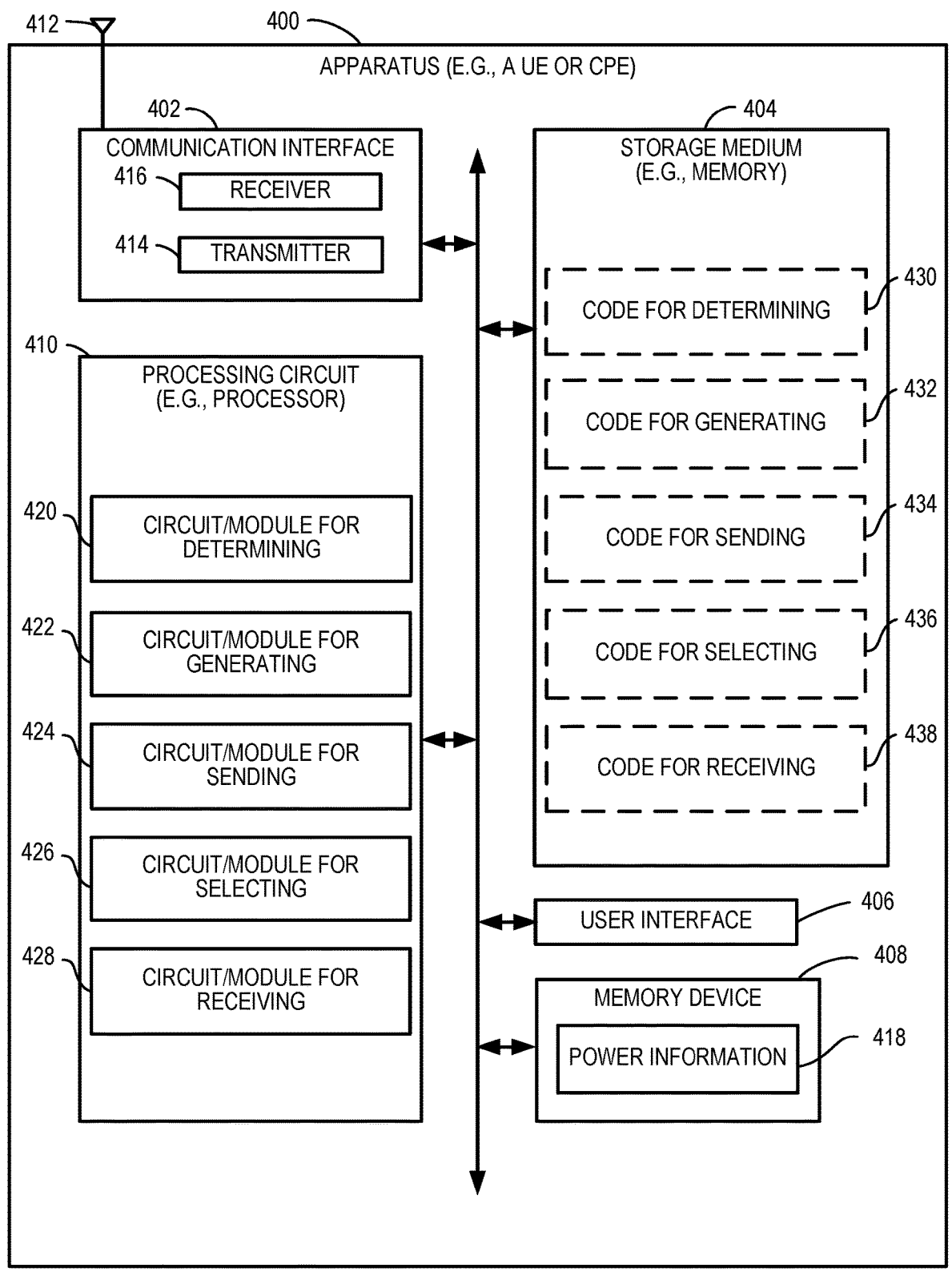
FIG. 4 is a block diagram illustrating an example hardware implementation for an apparatus (e.g., an electronic device) that can support communication in accordance with some aspects of the disclosure.

FIG. 4 illustrates a block diagram of an example hardware implementation of an apparatus 400 configured to communicate according to one or more aspects of the disclosure. The apparatus 400 could embody or be implemented within a UE, a CPE, a TRP, a base station (BS), an eNode B (eNB), a gNode B (gNB), or some other type of device that supports wireless communication. In various implementations, the apparatus 400 could embody or be implemented within an access terminal, an access point, or some other type of device. In various implementations, the apparatus 400 could embody or be implemented within a mobile phone, a smart phone, a tablet, a portable computer, a server, a personal computer, a sensor, an entertainment device, a medical device, or any other electronic device having circuitry.

The apparatus 400 includes a communication interface (e.g., at least one transceiver) 402, a storage medium 404, a user interface 406, a memory device (e.g., a memory circuit) 408, and a processing circuit 410 (e.g., at least one processor). In various implementations, the user interface 406 may include one or more of: a keypad, a display, a speaker, a microphone, a touchscreen display, of some other circuitry for receiving an input from or sending an output to a user.

These components can be coupled to and/or placed in electrical communication with one another via a signaling bus or other suitable component, represented generally by the connection lines in FIG. 4. The signaling bus may include any number of interconnecting buses and bridges depending on the specific application of the processing circuit 410 and the overall design constraints. The signaling bus links together various circuits such that each of the communication interface 402, the storage medium 404, the user interface 406, and the memory device 408 are coupled to and/or in electrical communication with the processing circuit 410. The signaling bus may also link various other circuits (not shown) such as timing sources, peripherals, voltage regulators, and power management circuits, which are well known in the art, and therefore, will not be described any further.

The communication interface 402 provides a means for communicating with other apparatuses over a transmission medium. In some implementations, the communication interface 402 includes circuitry and/or programming adapted to facilitate the communication of information bi-directionally with respect to one or more communication devices in a network. For example, the communication interface 402 may be adapted to facilitate wireless communication of the apparatus 400. Thus, in some implementations, the communication interface 402 may be coupled to one or more antennas 412 as shown in FIG. 4 for wireless communication within a wireless communication system. In some implementations, the communication interface 402 may be configured for wire-based communication. For example, the communication interface 402 could be a bus interface, a send/receive interface, or some other type of signal interface including drivers, buffers, or other circuitry for outputting and/or obtaining signals (e.g., outputting signal from and/or receiving signals into an integrated circuit). The communication interface 402 can be configured with one or more standalone receivers and/or transmitters, as well as one or more transceivers. In the illustrated example, the communication interface 402 includes a transmitter 414 and a receiver 416. The communication interface 402 serves as one example of a means for receiving and/or means transmitting.

The memory device 408 may represent one or more memory devices. As indicated, the memory device 408 may maintain power information 418 along with other information used by the apparatus 400. In some implementations, the memory device 408 and the storage medium 404 are implemented as a common memory component. The memory device 408 may also be used for storing data that is manipulated by the processing circuit 410 or some other component of the apparatus 400.

The storage medium 404 may represent one or more computer-readable, machine-readable, and/or processor-readable devices for storing programming, such as processor executable code or instructions (e.g., software, firmware), electronic data, databases, or other digital information. The storage medium 404 may also be used for storing data that is manipulated by the processing circuit 410 when executing programming. The storage medium 404 may be any available media that can be accessed by a general purpose or special purpose processor, including portable or fixed storage devices, optical storage devices, and various other mediums capable of storing, containing or carrying programming.

By way of example and not limitation, the storage medium 404 may include a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EE- PROM), a register, a removable disk, and any other suitable medium for storing software and/or instructions that may be accessed and read by a computer. The storage medium 404 may be embodied in an article of manufacture (e.g., a computer program product). By way of example, a computer program product may include a computer-readable medium in packaging materials. In view of the above, in some implementations, the storage medium 404 may be a non-transitory (e.g., tangible) storage medium.

The storage medium 404 may be coupled to the processing circuit 410 such that the processing circuit 410 can read information from, and write information to, the storage medium 404. That is, the storage medium 404 can be coupled to the processing circuit 410 so that the storage medium 404 is at least accessible by the processing circuit 410, including examples where at least one storage medium is integral to the processing circuit 410 and/or examples where at least one storage medium is separate from the processing circuit 410 (e.g., resident in the apparatus 400, external to the apparatus 400, distributed across multiple entities, etc.).

Programming stored by the storage medium 404, when executed by the processing circuit 410, causes the processing circuit 410 to perform one or more of the various functions and/or process operations described herein. For example, the storage medium 404 may include operations configured for regulating operations at one or more hardware blocks of the processing circuit 410, as well as to utilize the communication interface 402 for wireless communication utilizing their respective communication protocols.

The processing circuit 410 is generally adapted for processing, including the execution of such programming stored on the storage medium 404. As used herein, the terms "code" or "programming" shall be construed broadly to include without limitation instructions, instruction sets, data, code, code segments, program code, programs, programming, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 410 is arranged to obtain, process and/or send data, control data access and storage, issue commands, and control other desired operations. The processing circuit 410 may include circuitry configured to implement desired programming provided by appropriate media in at least one example. For example, the processing circuit 410 may be implemented as one or more processors, one or more controllers, and/or other structure configured to execute executable programming Examples of the processing circuit 410 may include a general purpose processor, a digital signal processor (DSP), an application-specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 410 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 410 are for illustration and other suitable configurations within the scope of the disclosure are also contemplated.

According to one or more aspects of the disclosure, the processing circuit 410 may be adapted to perform any or all of the features, processes, functions, operations and/or routines for any or all of the apparatuses described herein. For example, the processing circuit 410 may be configured to perform any of the steps, functions, and/or processes described with respect to FIG. 1-3 or 5. As used herein, the term "adapted" in relation to the processing circuit 410 may refer to the processing circuit 410 being one or more of configured, employed, implemented, and/or programmed to perform a particular process, function, operation and/or routine according to various features described herein.

The processing circuit 410 may be a specialized processor, such as an application-specific integrated circuit (ASIC) that serves as a means for (e.g., structure for) carrying out any one of the operations described in conjunction with FIG. 1-3 or 5. The processing circuit 410 serves as one example of a means for transmitting and/or a means for receiving. In various implementations, the processing circuit 410 may provide and/or incorporate, at least in part, the functionality described above for the second apparatus 204 (e.g., the power limit controller 206) of FIG. 2 and/or the second apparatus 304 (e.g., the power limit controller 306) of FIG. 3.

According to at least one example of the apparatus 400, the processing circuit 410 may include one or more of a circuit/module for determining 420, a circuit/module for generating 422, a circuit/module for sending 424, a circuit/module for selecting 426, or a circuit/module for receiving 428. In various implementations, the circuit/module for determining 420, the circuit/module for generating 422, the circuit/module for sending 424, the circuit/module for selecting 426, or the circuit/module for receiving 428 may provide and/or incorporate, at least in part, the functionality described above for the second apparatus 204 (e.g., the power limit controller 206) of FIG. 2 and/or the second apparatus 304 (e.g., the power limit controller 306) of FIG. 3.

As mentioned above, programming stored by the storage medium 404, when executed by the processing circuit 410, causes the processing circuit 410 to perform one or more of the various functions and/or process operations described herein. For example, the programming may cause the processing circuit 410 to perform the various functions, steps, and/or processes described herein with respect to FIG. 1-3 or 5 in various implementations. As shown in FIG. 4, the storage medium 404 may include one or more of code for determining 430, code for generating 432, code for sending 434, code for selecting 436, or code for receiving 438. In various implementations, the code for determining 430, the code for generating 432, the code for sending 434, the code for selecting 436, or the code for receiving 438 may be executed or otherwise used to provide the functionality described herein for the circuit/module for determining 420, the circuit/module for generating 422, the circuit/module for sending 424, the circuit/module for selecting 426, or the circuit/module for receiving 428.

The circuit/module for determining 420 may include circuitry and/or programming (e.g., code for determining 430 stored on the storage medium 404) adapted to perform several functions relating to, for example, determining information. In some aspects, the circuit/module for determining 420 (e.g., a means for determining) may correspond to, for example, a processing circuit.

Initially, the circuit/module for determining 420 may obtain information upon which the determination is to be based. For example, the circuit/module for determining 420 may obtain information (e.g., from the memory device 408, or some other component of the apparatus 400) regarding the identity of an apparatus, transmit power, at least one constraint or limit, a detection range, a beam configuration, an A-MPR indication, or some other condition. The circuit/module for determining 420 may then make the designated determination based on the obtained information (e.g., as discussed herein in conjunction with FIGS. 1-3). For example, the circuit/module for determining 420 may determine a transmit power limit for an apparatus, an average transmit power of an apparatus, an RF exposure constraint for a beam configuration, an RF exposure detection range of an apparatus, or an EIRP limit for an apparatus. The circuit/module for determining 420 may then output an indication of the determination to the circuit/module for generating 422, the circuit/module for selecting 426, the memory device 408, or some other component of the apparatus 400.

The circuit/module for generating 422 may include circuitry and/or programming (e.g., code for generating 432 stored on the storage medium 404) adapted to perform several functions relating to, for example, generating an indication. In some aspects, the circuit/module for generating 422 (e.g., a means for generating) may correspond to, for example, a processing circuit.

Initially, the circuit/module for generating 422 may obtain information upon which the generation is to be based. For example, the circuit/module for generating 422 may obtain information (e.g., from the memory device 408, or some other component of the apparatus 400) that specifies how an indication is to be generated (e.g., indicative of an exposure limit constraint). The circuit/module for generating 422 may then generate the indication based on the obtained information. For example, the circuit/module for generating 422 may generate an indication of whether a transmit power limit is constrained by an RF exposure limit as discussed herein (e.g., in conjunction with FIGS. 1-3). The circuit/module for generating 422 may then output the indication to the circuit/module for sending 424, the communication interface 402, the memory device 408, or some other component of the apparatus 400.

The circuit/module for sending 424 may include circuitry and/or programming (e.g., code for sending 434 stored on the storage medium 404) adapted to perform several functions relating to, for example, sending (e.g., transmitting) information. In some implementations, the circuit/module for sending 424 may obtain information (e.g., from the circuit/module for generating 422, the memory device 408, or some other component of the apparatus 400), process the information (e.g., encode the information for transmission), and send the information to another component (e.g., the transmitter 414, the communication interface 402, or some other component) that will transmit the information to another device. In some scenarios (e.g., if the circuit/module for sending 424 includes a transmitter), the circuit/module for sending 424 transmits the information directly to another device (e.g., the ultimate destination) via radio frequency signaling or some other type of signaling suitable for the applicable communication medium.

The circuit/module for sending 424 (e.g., a means for sending) may take various forms. In some aspects, the circuit/module for sending 424 may correspond to, for example, an interface (e.g., a bus interface, a send/receive interface, or some other type of signal interface), a communication device, a transceiver, a transmitter, or some other similar component as discussed herein. In some implementations, the communication interface 402 includes the circuit/module for sending 424 and/or the code for sending 448. In some implementations, the circuit/module for sending 424 and/or the code for sending 448 is configured to control the communication interface 402 (e.g., a transceiver or a transmitter) to send information.

The circuit/module for selecting 426 may include circuitry and/or programming (e.g., code for selecting 436 stored on the storage medium 404) adapted to perform several functions relating to, for example, selecting information. In some aspects, the circuit/module for selecting 426 (e.g., a means for selecting) may correspond to, for example, a processing circuit.

The circuit/module for selecting 426 may select information based on one or more inputs. For example, the circuit/module for selecting 426 may select a beam configuration for communication based on RF exposure constraints. Thus, the circuit/module for selecting 426 may initially obtain input information (e.g., from the circuit/module for determining 420, the memory device 408, or some other component of the apparatus 400). The circuit/module for circuit/module for selecting 426 can thus determine the beam configuration to be used based on the appropriate input (e.g., as discussed herein in conjunction with FIGS. 1-3). The circuit/module for selecting 426 may then output an indication (e.g., a beam configuration identifier) of the selection (e.g., to the circuit/module for sending 424, the communication interface 402, the memory device 408, or some other component of the apparatus 400).

The circuit/module for receiving 428 may include circuitry and/or programming (e.g., code for receiving 438 stored on the storage medium 404) adapted to perform several functions relating to, for example, receiving information. In some scenarios, the circuit/module for receiving 428 may obtain information (e.g., from the communication interface 402, the memory device, or some other component of the apparatus 400) and process (e.g., decode) the information. In some scenarios (e.g., if the circuit/module for receiving 428 is or includes an RF receiver), the circuit/module for receiving 428 may receive information directly from a device that transmitted the information. In either case, the circuit/module for receiving 428 may output the obtained information to another component of the apparatus 400 (e.g., the circuit/module for detecting 424, the memory device 408, or some other component).

The circuit/module for receiving 428 (e.g., a means for receiving) may take various forms. In some aspects, the circuit/module for receiving 428 may correspond to, for example, an interface (e.g., a bus interface, a send/receive interface, or some other type of signal interface), a communication device, a transceiver, a receiver, or some other similar component as discussed herein. In some implementations, the communication interface 402 includes the circuit/module for receiving 428 and/or the code for receiving 438. In some implementations, the circuit/module for receiving 428 and/or the code for receiving 438 is configured to control the communication interface 402 (e.g., a transceiver or a receiver) to receive information.

First Example Process

Figure 5:
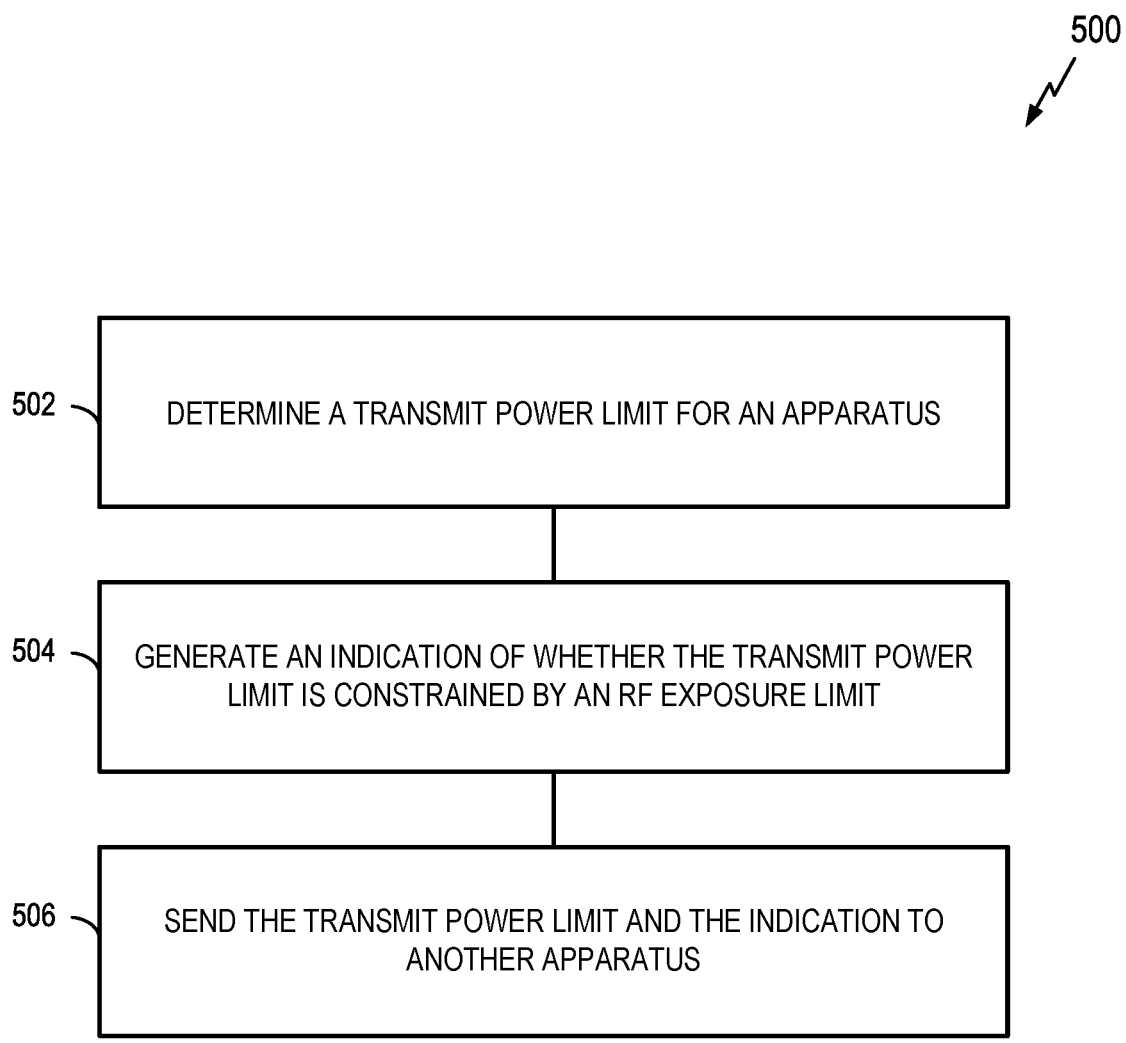
FIG. 5 is a flowchart illustrating an example of a reporting process in accordance with some aspects of the disclosure.

FIG. 5 illustrates a process 500 for communication in accordance with some aspects of the disclosure. The process 500 may take place within a processing circuit (e.g., the processing circuit 410 of FIG. 4), which may be located in a UE, a CPE, a TRP, a BS, an eNB, a gNB, or some other suitable apparatus. Of course, in various aspects within the scope of the disclosure, the process 500 may be implemented by any suitable apparatus capable of supporting communication-related operations.

At block 502, an apparatus (e.g., a UE, or CPE) determines a transmit power limit for the apparatus. In some aspects, the transmit power limit may be a power headroom limit. In some aspects, the transmit power limit may be for a particular sub-array (e.g., an antenna sub-array) of the apparatus. In some aspects, the transmit power limit may be for a particular beam (e.g., an RF beam) of the apparatus. In some aspects, the determination of the transmit power limit may be based on an RF exposure detection range of the apparatus.

The determination of block 502 may take various forms. In some aspects, the determination may involve retrieving a limit from a memory component. In some aspects, the determination may involve calculating a limit. In some aspects, the determination may involve sensing and determining the limit based on the sensing. Other forms of determining may be used as well consistent with the teachings herein.

At block 504, the apparatus generates an indication of whether the transmit power limit is constrained by a radio frequency (RF) exposure limit. In some aspects, the radio frequency exposure limit may be a maximum permissible exposure (MPE) regulatory limit. In some aspects, the indication may indicate whether the transmit power limit is constrained by a maximum transmit power limit.

At block 506, the apparatus sends the transmit power limit and the indication to another apparatus (e.g., an eNB). In some aspects, the apparatus may also send an indication of the RF exposure detection range to the other apparatus.

The process 500 could include other operations as well. For example, the process 500 may include determining an average transmit power of the apparatus; and sending an indication of the average transmit power to the other apparatus. As another example, the process 500 may include determining an average transmit power of the apparatus, wherein the determination of the transmit power limit may be based on the average transmit power. As yet another example, the process 500 may include determining, for each of a plurality of beam configurations, a corresponding RF exposure constraint for the beam configuration; and selecting one of the beam configurations for communication based on the corresponding RF exposure constraints. Also, the process 500 may include determining an RF exposure detection range of the apparatus; and determining an effective isotropic radiated power (EIRP) limit for the apparatus based on the RF exposure detection range.

In some aspects, the process 500 may include receiving an indication of Additional Maximum Power Reduction (A-MPR), wherein the determination of the transmit power limit may be based on the indication of A-MPR. In this case, the process 500 may include receiving, in conjunction with the indication of A-MPR, a trigger to maintain coverage while reducing peak power, wherein the maintaining of coverage while reducing peak power relates to: longer repetitions, smaller allocations, longer hybrid automatic repeat requests (HARQs), longer demodulation reference signals (DMRSs), or any combination thereof. Also in this case, the process 500 may include receiving, in conjunction with the indication of A-MPR, a trigger to enhance coverage, wherein the enhancement of coverage may include: longer repetitions, smaller allocations, longer hybrid automatic repeat requests (HARQs), longer demodulation reference signals (DMRSs), or any combination thereof.

In some aspects, the process 500 may include any combination of the above operations.

Second Example Process

Figure 6:
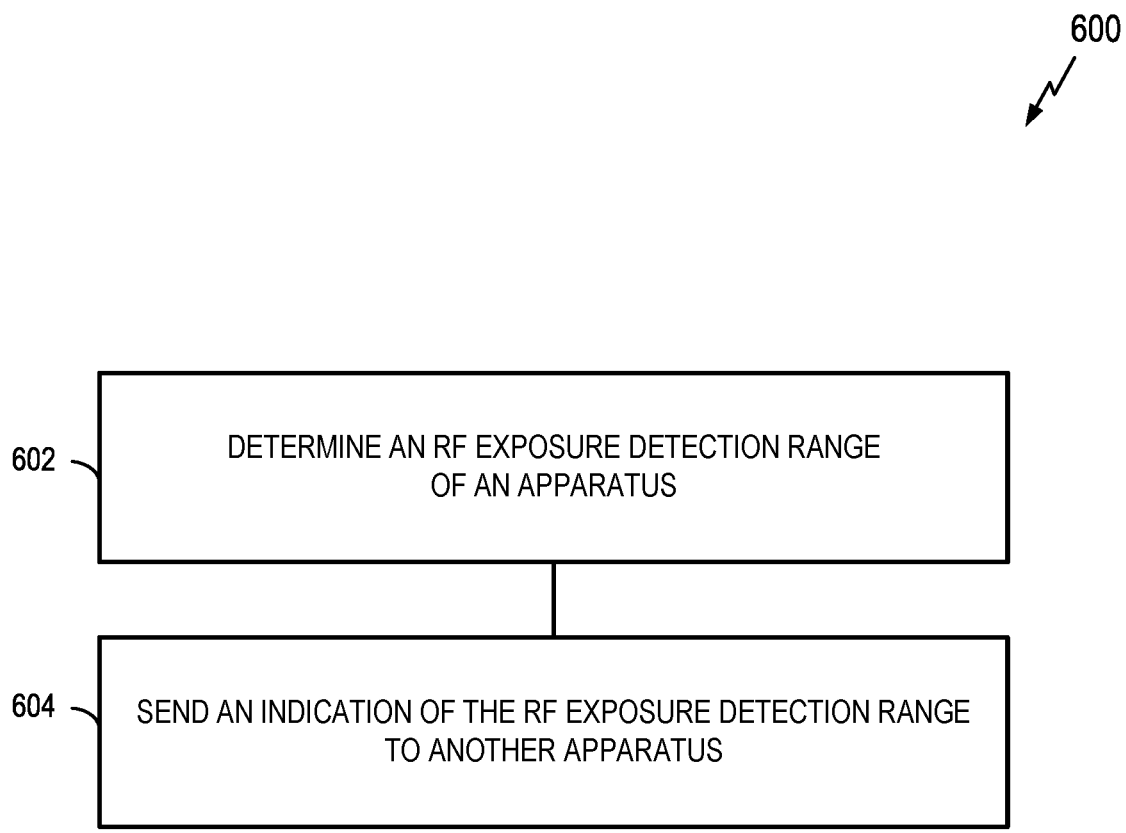
FIG. 6 is a flowchart illustrating an example of a process for indicating an RF exposure detection range in accordance with some aspects of the disclosure.

FIG. 6 illustrates a process 600 for communication in accordance with some aspects of the disclosure. One or more aspects of the process 600 may be used in conjunction with (e.g., in addition to or as part of) the process 500 of FIG. 5. The process 600 may take place within a processing circuit (e.g., the processing circuit 410 of FIG. 4), which may be located in a UE, a CPE, a TRP, a BS, an eNB, a gNB, or some other suitable apparatus. Of course, in various aspects within the scope of the disclosure, the process 600 may be implemented by any suitable apparatus capable of supporting communication-related operations.

At block 602, an apparatus (e.g., a UE, or CPE) determines an RF exposure detection range of the apparatus (e.g., a first apparatus).

At block 604, the apparatus sends an indication of the RF exposure detection range to another apparatus (e.g., a second apparatus).

In some aspects, the process 600 may include any combination of the above operations.

Third Example Process

Figure 7:
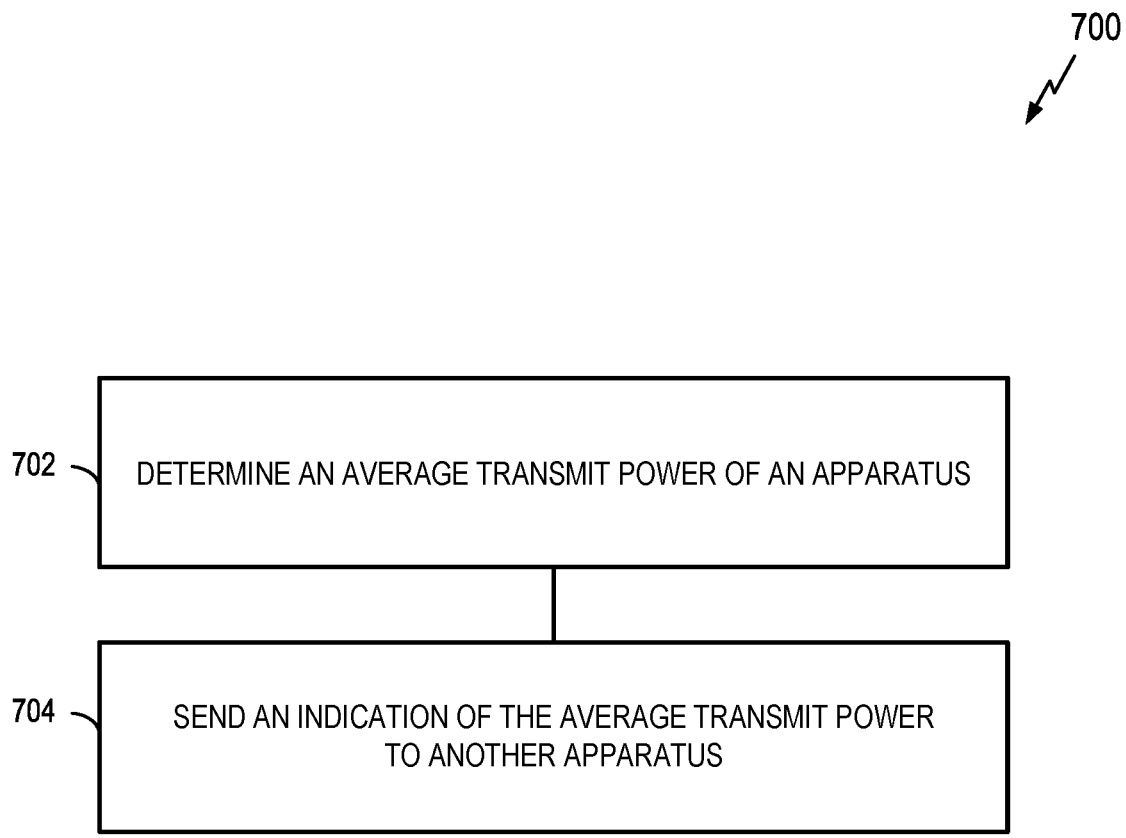
FIG. 7 is a flowchart illustrating an example of a process for indicating an average transmit power in accordance with some aspects of the disclosure.

FIG. 7 illustrates a process 700 for communication in accordance with some aspects of the disclosure. One or more aspects of the process 700 may be used in conjunction with (e.g., in addition to or as part of) the process 500 of FIG. 5. The process 700 may take place within a processing circuit (e.g., the processing circuit 410 of FIG. 4), which may be located in a UE, a CPE, a TRP, a BS, an eNB, a gNB, or some other suitable apparatus. Of course, in various aspects within the scope of the disclosure, the process 700 may be implemented by any suitable apparatus capable of supporting communication-related operations.

At block 702, an apparatus (e.g., a UE, or CPE) determines an average transmit power of the apparatus (e.g., a first apparatus).

At block 704, the apparatus sends an indication of the average transmit power to another apparatus (e.g., a second apparatus).

In some aspects, the process 700 may include any combination of the above operations.

Fourth Example Process

Figure 8:
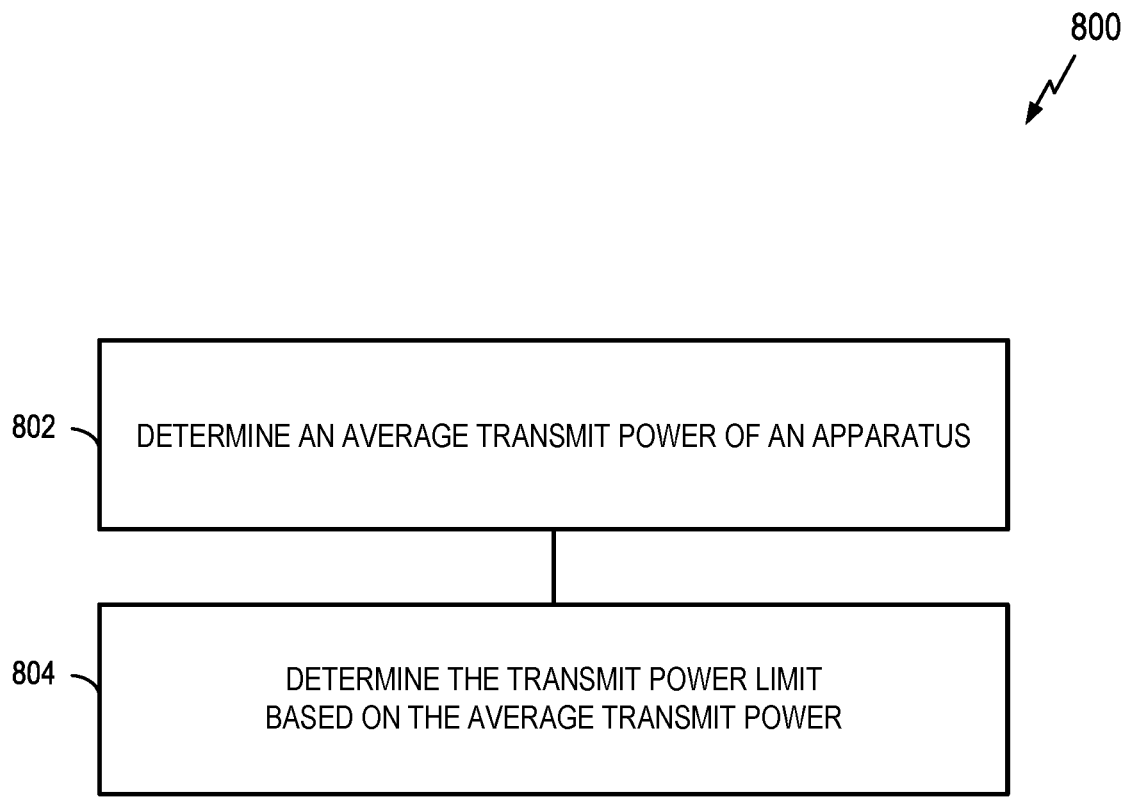
FIG. 8 is a flowchart illustrating an example of a process for determining a transmit power limit in accordance with some aspects of the disclosure.

FIG. 8 illustrates a process 800 for communication in accordance with some aspects of the disclosure. One or more aspects of the process 800 may be used in conjunction with (e.g., in addition to or as part of) the process 500 of FIG. 5. The process 800 may take place within a processing circuit (e.g., the processing circuit 410 of FIG. 4), which may be located in a UE, a CPE, a TRP, a BS, an eNB, a gNB, or some other suitable apparatus. Of course, in various aspects within the scope of the disclosure, the process 800 may be implemented by any suitable apparatus capable of supporting communication-related operations.

At block 802, an apparatus (e.g., a UE, or CPE) determines an average transmit power of the apparatus (e.g., a first apparatus).

At block 804, the apparatus determines the transmit power limit based on the average transmit power.

In some aspects, the process 800 may include any combination of the above operations.

Fifth Example Process

Figure 9:
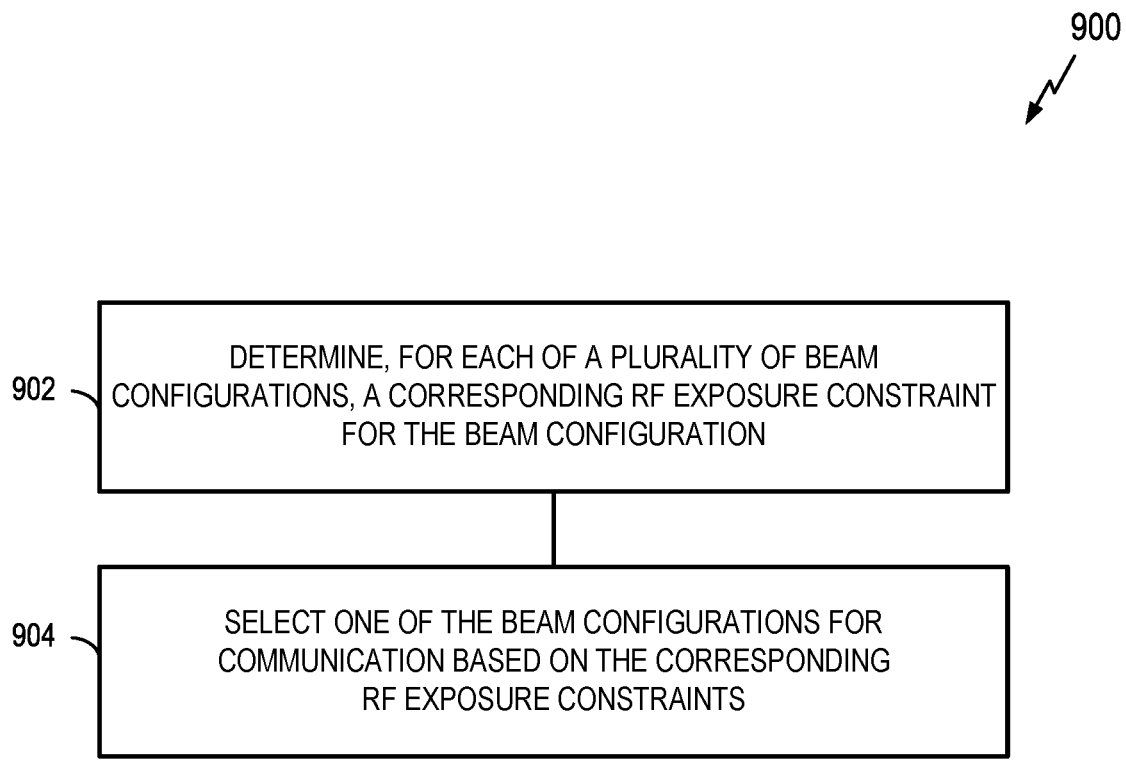
FIG. 9 is a flowchart illustrating an example of a process for selecting a beam configuration in accordance with some aspects of the disclosure.

FIG. 9 illustrates a process 900 for communication in accordance with some aspects of the disclosure. One or more aspects of the process 900 may be used in conjunction with (e.g., in addition to or as part of) the process 500 of FIG. 5. The process 900 may take place within a processing circuit (e.g., the processing circuit 410 of FIG. 4), which may be located in a UE, a CPE, a TRP, a BS, an eNB, a gNB, or some other suitable apparatus. Of course, in various aspects within the scope of the disclosure, the process 900 may be implemented by any suitable apparatus capable of supporting communication-related operations.

At block 902, an apparatus (e.g., a UE, or CPE) determines, for each of a plurality of beam configurations, a corresponding RF exposure constraint for the beam configuration.

At block 904, the apparatus selects one of the beam configurations for communication based on the corresponding RF exposure constraints.

In some aspects, the process 900 may include any combination of the above operations.

Sixth Example Process

Figure 10:
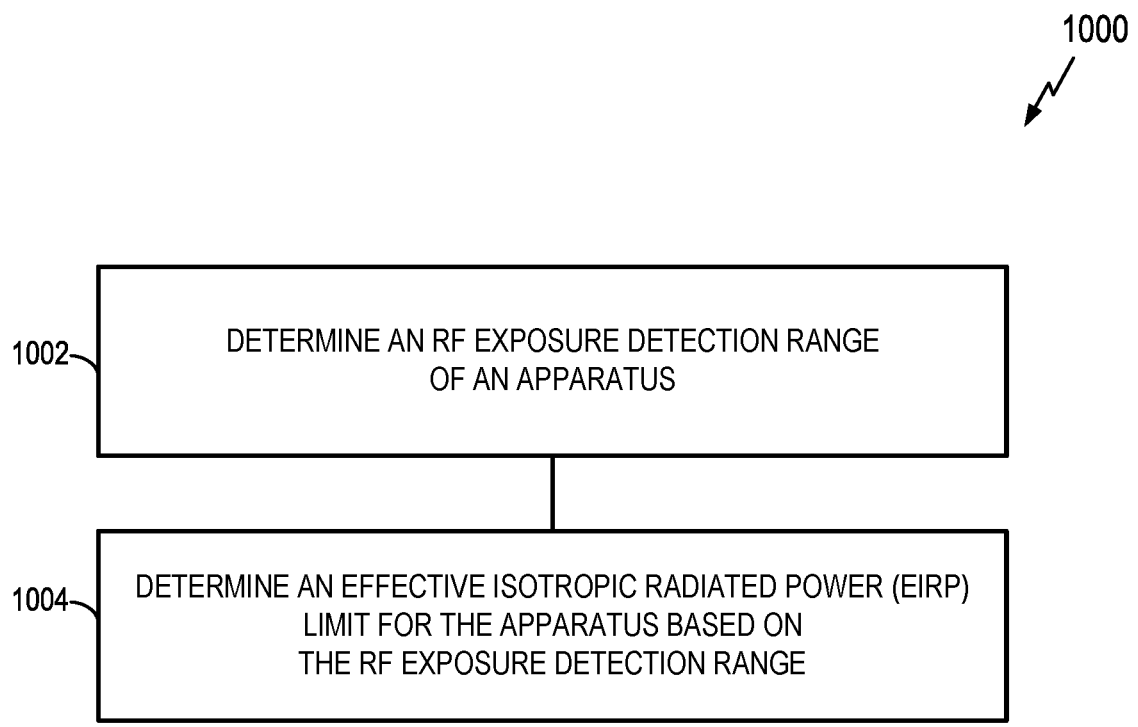
FIG. 10 is a flowchart illustrating an example of a process for determining an effective isotropic radiated power in accordance with some aspects of the disclosure.

FIG. 10 illustrates a process 1000 for communication in accordance with some aspects of the disclosure. One or more aspects of the process 1000 may be used in conjunction with (e.g., in addition to or as part of) the process 500 of FIG. 5. The process 1000 may take place within a processing circuit (e.g., the processing circuit 410 of FIG. 4), which may be located in a UE, a CPE, a TRP, a BS, an eNB, a gNB, or some other suitable apparatus. Of course, in various aspects within the scope of the disclosure, the process 1000 may be implemented by any suitable apparatus capable of supporting communication-related operations.

At block 1002, an apparatus (e.g., a UE, or CPE) determines an RF exposure detection range of the apparatus (e.g., a first apparatus).

At block 1004, the apparatus determines an effective isotropic radiated power (EIRP) limit for the apparatus based on the RF exposure detection range.

In some aspects, the process 1000 may include any combination of the above operations.

Seventh Example Process

Figure 11:
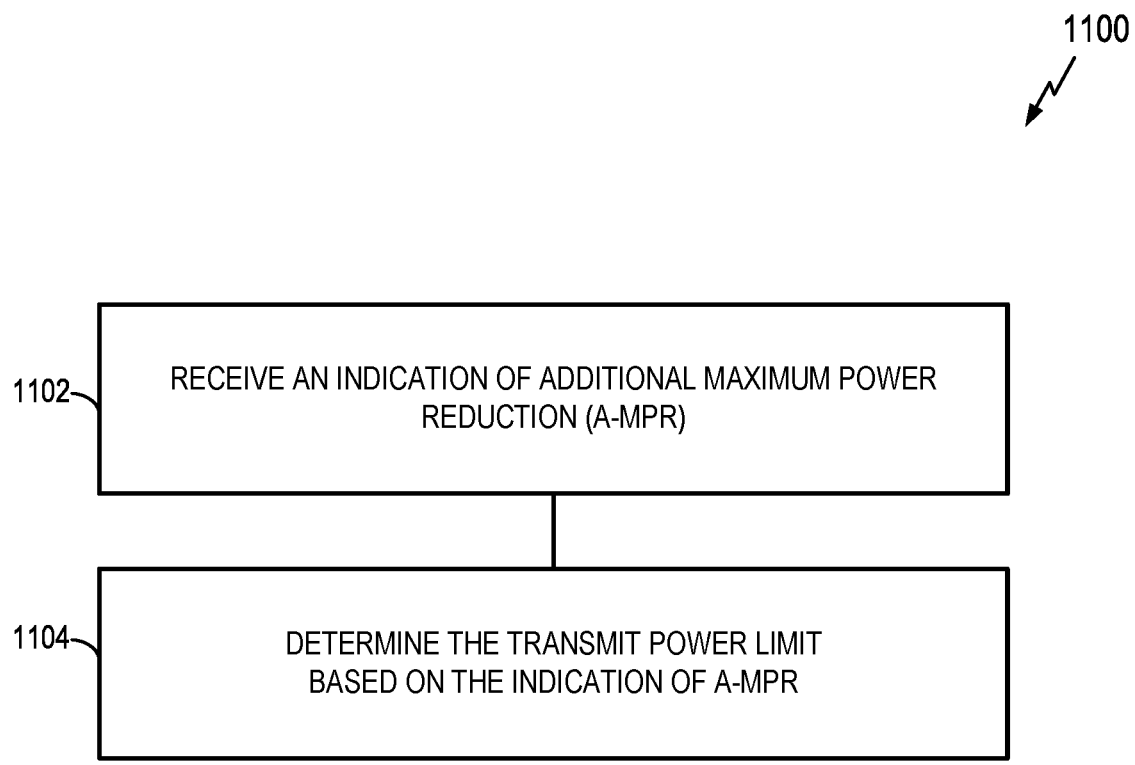
FIG. 11 is a flowchart illustrating an example of a process for determining a transmit power limit in accordance with some aspects of the disclosure.

FIG. 11 illustrates a process 1100 for communication in accordance with some aspects of the disclosure. One or more aspects of the process 1100 may be used in conjunction with (e.g., in addition to or as part of) the process 500 of FIG. 5. The process 1100 may take place within a processing circuit (e.g., the processing circuit 410 of FIG. 4), which may be located in a UE, a CPE, a TRP, a BS, an eNB, a gNB, or some other suitable apparatus. Of course, in various aspects within the scope of the disclosure, the process 1100 may be implemented by any suitable apparatus capable of supporting communication-related operations.

At block 1102, an apparatus (e.g., a UE, or CPE) receives an indication of Additional Maximum Power Reduction (A-MPR).

At block 1104, the apparatus determines the transmit power limit based on the indication of A-MPR.

In some aspects, the process 1100 may include any combination of the above operations.

Eighth Example Process

Figure 12:
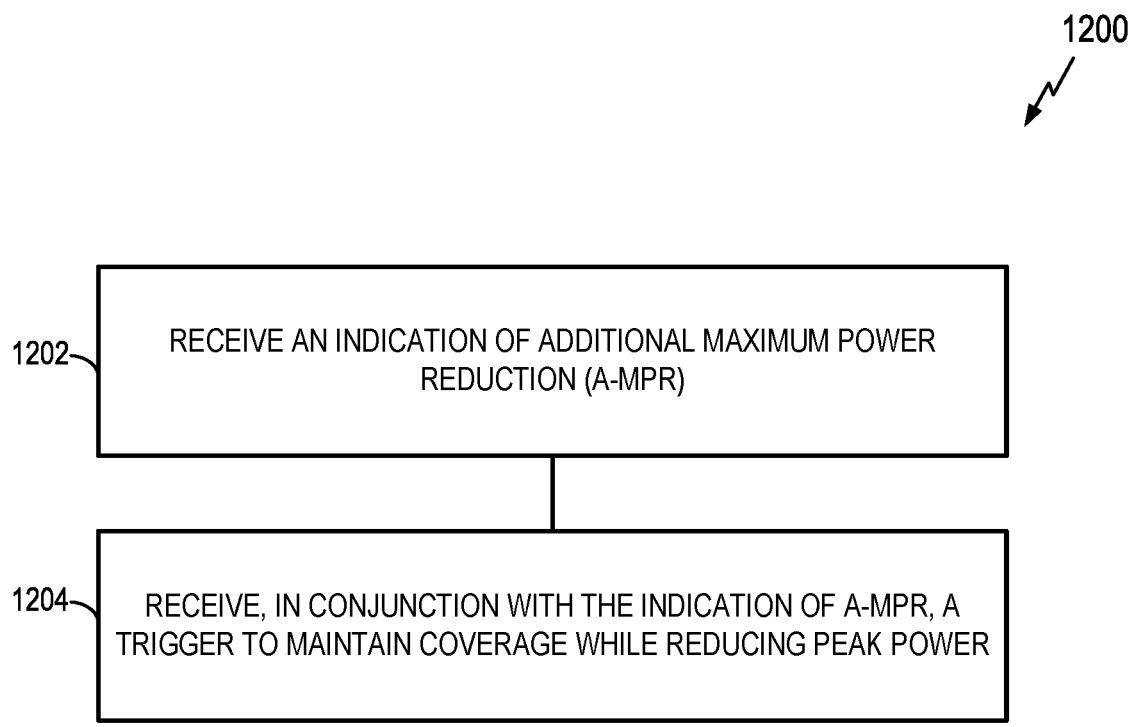
FIG. 12 is a flowchart illustrating an example of a process for receiving a trigger in accordance with some aspects of the disclosure.

FIG. 12 illustrates a process 1200 for communication in accordance with some aspects of the disclosure. One or more aspects of the process 1200 may be used in conjunction with (e.g., in addition to or as part of) the process 500 of FIG. 5. The process 1200 may take place within a processing circuit (e.g., the processing circuit 410 of FIG. 4), which may be located in a UE, a CPE, a TRP, a BS, an eNB, a gNB, or some other suitable apparatus. Of course, in various aspects within the scope of the disclosure, the process 1200 may be implemented by any suitable apparatus capable of supporting communication-related operations.

At block 1202, an apparatus (e.g., a UE, or CPE) receives an indication of Additional Maximum Power Reduction (A-MPR).

At block 1204, the apparatus receives, in conjunction with the indication of A-MPR, a trigger to maintain coverage while reducing peak power.

In some aspects, the process 1200 may include any combination of the above operations.

Second Example Apparatus

Figure 13:
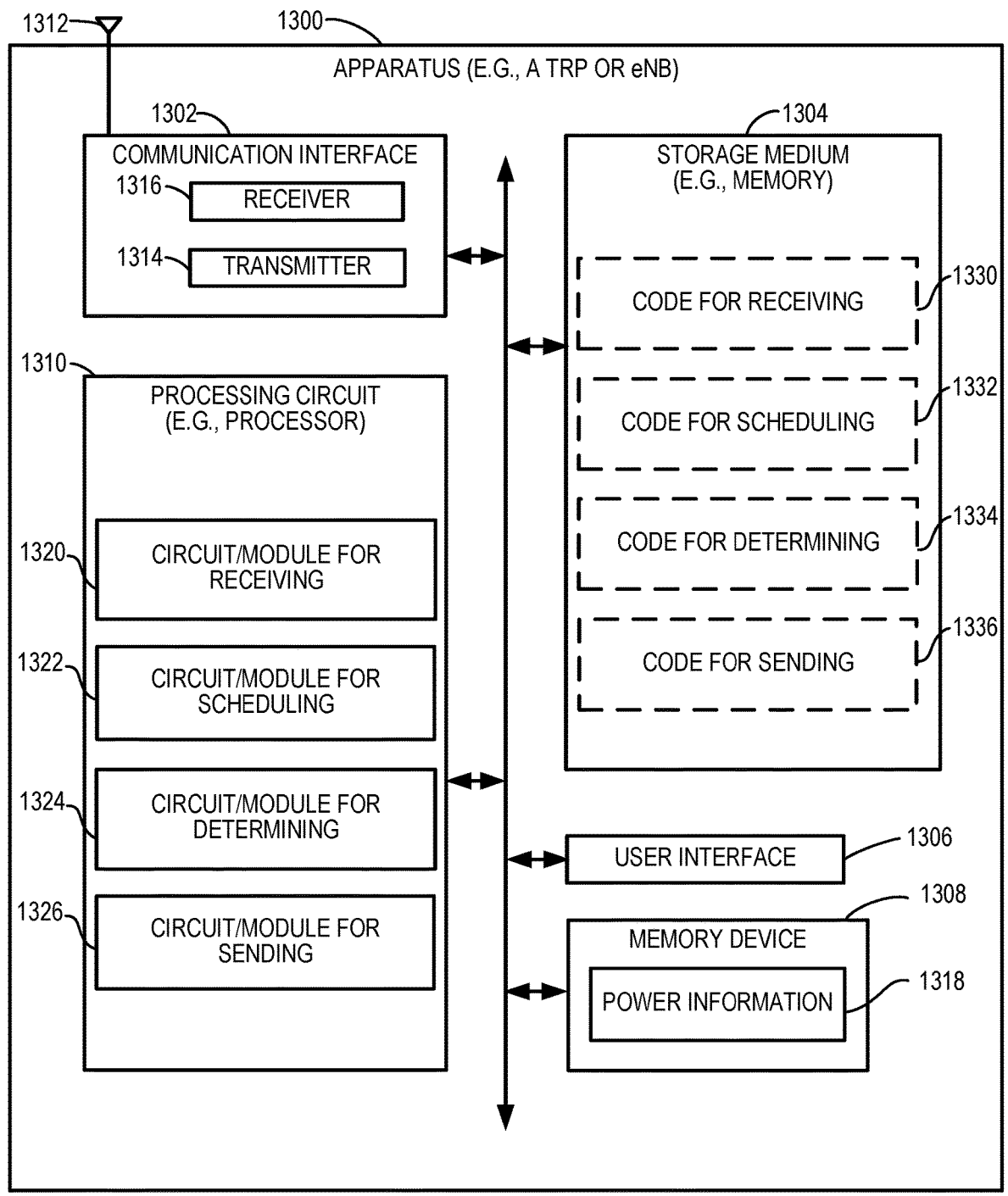
FIG. 13 is a block diagram illustrating an example hardware implementation for an apparatus (e.g., an electronic device) that can support communication in accordance with some aspects of the disclosure.

FIG. 13 illustrates a block diagram of an example hardware implementation of an apparatus 1300 configured to communicate according to one or more aspects of the disclosure. The apparatus 1300 could embody or be implemented within a TRP, a base station (BS), an eNode B (eNB), a gNode B (gNB), a UE, a CPE, or some other type of device that supports wireless communication. In various implementations, the apparatus 1300 could embody or be implemented within an access terminal, an access point, or some other type of device. In various implementations, the apparatus 1300 could embody or be implemented within a mobile phone, a smart phone, a tablet, a portable computer, a server, a personal computer, a sensor, an entertainment device, a medical device, or any other electronic device having circuitry.

The apparatus 1300 includes a communication interface (e.g., at least one transceiver) 1302, a storage medium 1304, a user interface 1306, a memory device 1308 (e.g., storing power information 1318), and a processing circuit 1310 (e.g., at least one processor). In various implementations, the user interface 1306 may include one or more of: a keypad, a display, a speaker, a microphone, a touchscreen display, of some other circuitry for receiving an input from or sending an output to a user. The communication interface 1302 may be coupled to one or more antennas 1312, and may include a transmitter 1314 and a receiver 1316. In general, the components of FIG. 13 may be similar to corresponding components of the apparatus 400 of FIG. 4.

According to one or more aspects of the disclosure, the processing circuit 1310 may be adapted to perform any or all of the features, processes, functions, operations and/or routines for any or all of the apparatuses described herein. For example, the processing circuit 1310 may be configured to perform any of the steps, functions, and/or processes described with respect to FIGS. 1-3 and 14. As used herein, the term "adapted" in relation to the processing circuit 1310 may refer to the processing circuit 1310 being one or more of configured, employed, implemented, and/or programmed to perform a particular process, function, operation and/or routine according to various features described herein.

The processing circuit 1310 may be a specialized processor, such as an application-specific integrated circuit (ASIC) that serves as a means for (e.g., structure for) carrying out any one of the operations described in conjunction with FIGS. 1-3 and 14. The processing circuit 1310 serves as one example of a means for transmitting and/or a means for receiving. In various implementations, the processing circuit 1310 may provide and/or incorporate, at least in part, the functionality described above for the first apparatus 202 (e.g., the scheduler 212) of FIG. 2 and/or the first apparatus 302 (e.g., the scheduler 320) of FIG. 3.

According to at least one example of the apparatus 1300, the processing circuit 1310 may include one or more of a circuit/module for receiving 1320, a circuit/module for scheduling 1322, a circuit/module for determining 1324, or a circuit/module for sending 1326. In various implementations, the circuit/module for receiving 1320, the circuit/module for scheduling 1322, the circuit/module for determining 1324, or the circuit/module for sending 1326 may provide and/or incorporate, at least in part, the functionality described above for the first apparatus 202 (e.g., the scheduler 212) of FIG. 2 and/or the first apparatus 302 (e.g., the scheduler 320) of FIG. 3.

As mentioned above, programming stored by the storage medium 1304, when executed by the processing circuit 1310, causes the processing circuit 1310 to perform one or more of the various functions and/or process operations described herein. For example, the programming may cause the processing circuit 1310 to perform the various functions, steps, and/or processes described herein with respect to FIGS. 1-3 and 14 in various implementations. As shown in FIG. 13, the storage medium 1304 may include one or more of code for receiving 1330, code for scheduling 1332, code for determining 1334, or code for sending 1336. In various implementations, the code for receiving 1330, the code for scheduling 1332, the code for determining 1334, or the code for sending 1336 may be executed or otherwise used to provide the functionality described herein for the circuit/module for receiving 1320, the circuit/module for scheduling 1322, the circuit/module for determining 1324, or the circuit/module for sending 1326.

The circuit/module for receiving 1320 may include circuitry and/or programming (e.g., code for receiving 1330 stored on the storage medium 1304) adapted to perform several functions relating to, for example, receiving information. In some scenarios, the circuit/module for receiving 1320 may obtain information (e.g., from the communication interface 1302, the memory device, or some other component of the apparatus 1300) and process (e.g., decode) the information. In some scenarios (e.g., if the circuit/module for receiving 1320 is or includes an RF receiver), the circuit/module for receiving 1320 may receive information directly from a device that transmitted the information. In either case, the circuit/module for receiving 1320 may output the obtained information to another component of the apparatus 1300 (e.g., the circuit/module for scheduling 1322, the memory device 1308, or some other component).

The circuit/module for receiving 1320 (e.g., a means for receiving) may take various forms. In some aspects, the circuit/module for receiving 1320 may correspond to, for example, an interface (e.g., a bus interface, a send/receive interface, or some other type of signal interface), a communication device, a transceiver, a receiver, or some other similar component as discussed herein. In some implementations, the communication interface 1302 includes the circuit/module for receiving 1320 and/or the code for receiving 1330. In some implementations, the circuit/module for receiving 1320 and/or the code for receiving 1330 is configured to control the communication interface 1302 (e.g., a transceiver or a receiver) to receive information.

The circuit/module for scheduling 1322 may include circuitry and/or programming (e.g., code for scheduling 1332 stored on the storage medium 1304) adapted to perform several functions relating to, for example, generating a schedule. In some aspects, the circuit/module for scheduling 1322 (e.g., a means for scheduling) may correspond to, for example, a processing circuit.

Initially, the circuit/module for scheduling 1322 may obtain information upon which the schedule is to be based. For example, the circuit/module for scheduling 1322 may obtain information (e.g., from the memory device 1308, or some other component of the apparatus 1300) that controls how the schedule is to be generated (e.g., indicative of a transmit power limit and/or an exposure limit constraint). The circuit/module for scheduling 1322 may then generate the schedule based on the obtained information. For example, the circuit/module for scheduling 1322 may schedule another apparatus based on a transmit power limit and an indication of whether the transmit power limit is constrained by a radio frequency (RF) exposure limit as discussed herein (e.g., in conjunction with FIGS. 1-3). The circuit/module for scheduling 1322 may then output the schedule to the circuit/module for sending 1326, the communication interface 1302, the memory device 1308, or some other component of the apparatus 1300.

The circuit/module for determining 1324 may include circuitry and/or programming (e.g., code for determining 1334 stored on the storage medium 1304) adapted to perform several functions relating to, for example, determining information. In some aspects, the circuit/module for determining 1324 (e.g., a means for determining) may correspond to, for example, a processing circuit.

Initially, the circuit/module for determining 1324 may obtain information upon which the determination is to be based. For example, the circuit/module for determining 1324 may obtain information (e.g., from the memory device 1308, or some other component of the apparatus 1300) regarding an exposure limit, duty cycling, allocated slots, a power limit, a modulation and coding scheme, or some other condition. The circuit/module for determining 1328 may then make the designated determination based on the obtained information (e.g., as discussed herein in conjunction with FIGS. 1-3). For example, the circuit/module for determining 1324 may determine that an indication indicates that a transmit power limit is constrained by an RF exposure limit, determine an average transmit power based on duty cycling of transmissions by another apparatus, determine an average transmit power based on a ratio of allocated uplink slots to allocated downlink slots, determine an average transmit power based on a ratio of slot allocations among different users, determine a modulation and coding scheme (MCS) based on at least one of: duty cycling of transmissions by another apparatus, an RF exposure limit, a maximum power limit, or any combination thereof, determine an average transmit power based on the MCS, or determine an average transmit power based on duty cycling between different carrier frequencies. The circuit/module for determining 1328 may then output an indication of the determination to the circuit/module for scheduling 1322, the circuit/module for sending 1326, the memory device 1308, or some other component of the apparatus 1300.

The circuit/module for sending 1326 may include circuitry and/or programming (e.g., code for sending 1336 stored on the storage medium 1304) adapted to perform several functions relating to, for example, sending (e.g., transmitting) information. In some implementations, the circuit/module for sending 1326 may obtain information (e.g., from the circuit/module for determining 1324, the memory device 1308, or some other component of the apparatus 1300), process the information (e.g., encode the information for transmission), and send the information to another component (e.g., the transmitter 1314, the communication interface 1302, or some other component) that will transmit the information to another device. In some scenarios (e.g., if the circuit/module for sending 1326 includes a transmitter), the circuit/module for sending 1326 transmits the information directly to another device (e.g., the ultimate destination) via radio frequency signaling or some other type of signaling suitable for the applicable communication medium.

The circuit/module for sending 1326 (e.g., a means for sending) may take various forms. In some aspects, the circuit/module for sending 1326 may correspond to, for example, an interface (e.g., a bus interface, a send/receive interface, or some other type of signal interface), a communication device, a transceiver, a transmitter, or some other similar component as discussed herein. In some implementations, the communication interface 1302 includes the circuit/module for sending 1326 and/or the code for sending 1336. In some implementations, the circuit/module for sending 1326 and/or the code for sending 1336 is configured to control the communication interface 1302 (e.g., a transceiver or a transmitter) to send information.

Ninth Example Process

Figure 14:
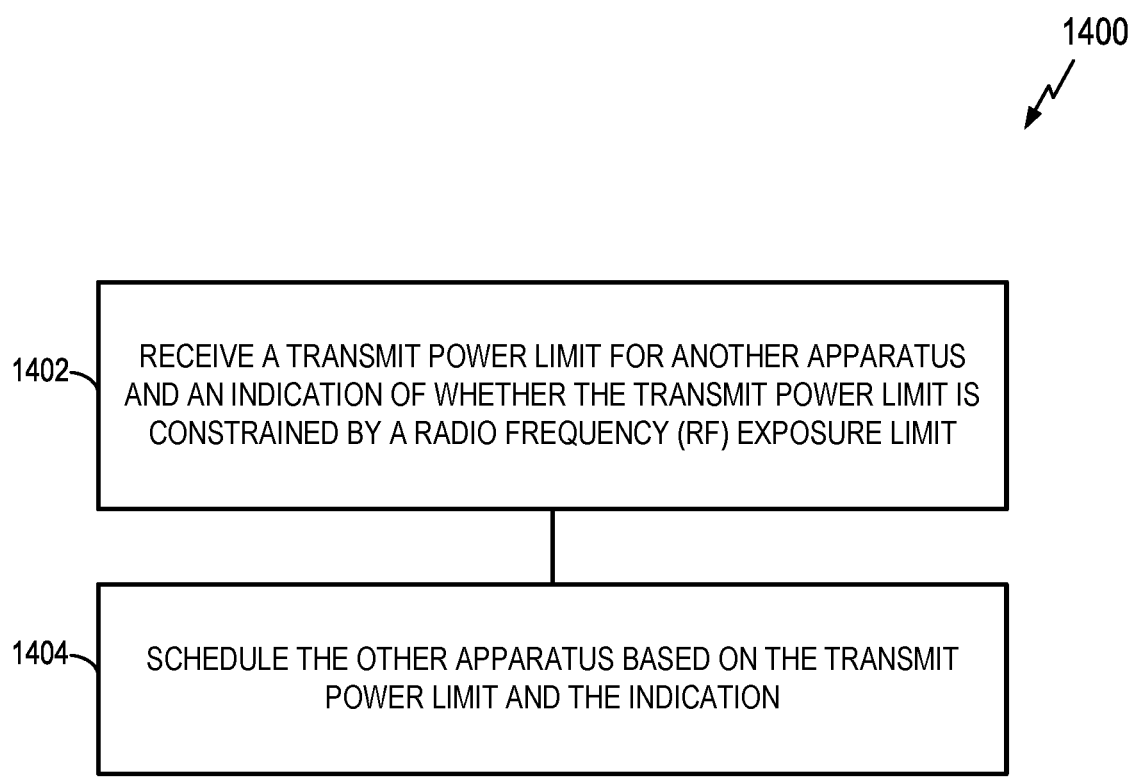
FIG. 14 is a flowchart illustrating an example of a scheduling process in accordance with some aspects of the disclosure.

FIG. 14 illustrates a process 1400 for communication in accordance with some aspects of the disclosure. The process 1400 may take place within a processing circuit (e.g., the processing circuit 1310 of FIG. 13), which may be located in a TRP, a BS, an eNB, a gNB, a UE, a CPE, or some other suitable apparatus. Of course, in various aspects within the scope of the disclosure, the process 1400 may be implemented by any suitable apparatus capable of supporting communication-related operations.

At block 1402, an apparatus (e.g., a TRP) receives a transmit power limit for another apparatus (e.g., a UE or CPE) and an indication of whether the transmit power limit is constrained by a radio frequency (RF) exposure limit. In some aspects, the radio frequency exposure limit may include a maximum permissible exposure (MPE) regulatory limit. In some aspects, the radio frequency exposure limit may include both an MPE regulatory limit and a specific absorption rate (SAR) regulatory limit.

In some aspects, the transmit power limit may include a power headroom limit. In some aspects, the transmit power limit may be for a particular sub-array (e.g., an antenna sub-array) of the other apparatus. In some aspects, the transmit power limit may be for a particular beam (e.g., an RF beam) of the other apparatus.

At block 1404, the apparatus schedules the other apparatus (e.g., a second apparatus) based on the transmit power limit and the indication received at block 1402. In some aspects, the scheduling may include determining that the indication indicates that the transmit power limit is not constrained by the RF exposure limit; and scheduling the other apparatus based on an instantaneous maximum transmit power for the other apparatus.

In some aspects, the scheduling may include determining that the indication indicates that the transmit power limit is constrained by the RF exposure limit; and, as a result of the determination, scheduling the other apparatus based on an average transmit power over a period of time. The process 1400 may further include determining the average transmit power based on: duty cycling of transmissions by the other apparatus, a ratio of allocated uplink slots to allocated downlink slots, a ratio of slot allocations among different users, or any combination thereof. The process 1400 may further include determining a modulation and coding scheme (MCS) based on at least one of: duty cycling of transmissions by the other apparatus, the RF exposure limit, a maximum power limit, or any combination thereof; and determining the average transmit power based the MCS. The process 1400 may further include determining the average transmit power based on duty cycling between different carrier frequencies.

In some aspects, the process 1400 may include receiving an indication of an RF exposure detection range of the other apparatus, wherein the scheduling is further based on the RF exposure detection range. In some aspects, the process 1400 may include receiving an indication of an average transmission power of the other apparatus for a period of time, wherein the scheduling is further based on the average transmission power.

In some aspects, the process 1400 may include determining that the indication indicates that the transmit power limit is constrained by the RF exposure limit; and sending an indication of Additional Maximum Power Reduction (A-MPR) to the other apparatus as a result of the determination. In some aspects, the process 1400 may include sending to the other apparatus, as a result of the determination, a trigger to enhance coverage, wherein the enhancement of coverage comprises: longer repetitions, smaller allocations, longer hybrid automatic repeat requests (HARQs), longer demodulation reference signals (DMRSs), or any combination thereof.

In some aspects, the process 1400 may include any combination of the above operations.

Tenth Example Process

Figure 15:
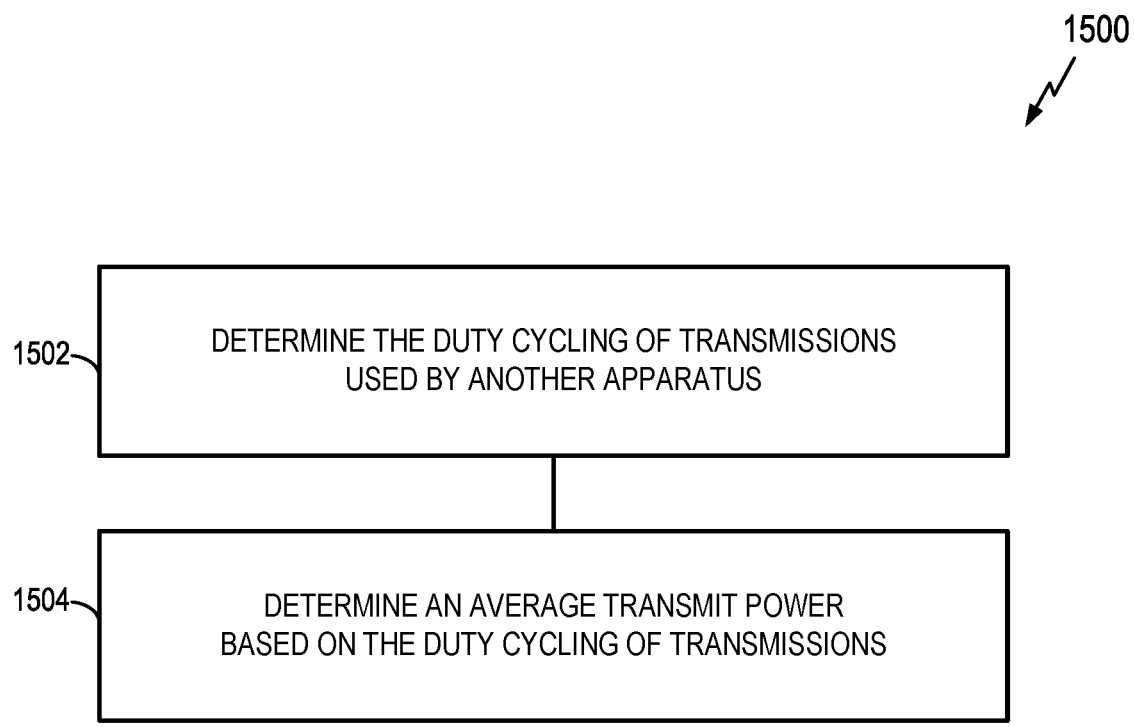
FIG. 15 is a flowchart illustrating an example of a process for determining an average transmit power based on duty cycling in accordance with some aspects of the disclosure.

FIG. 15 illustrates a process 1500 for communication in accordance with some aspects of the disclosure. One or more aspects of the process 1500 may be used in conjunction with (e.g., in addition to or as part of) the process 1400 of FIG. 14. The process 1500 may take place within a processing circuit (e.g., the processing circuit 1310 of FIG. 13), which may be located in a TRP, a BS, an eNB, a gNB, a UE, a CPE, or some other suitable apparatus. Of course, in various aspects within the scope of the disclosure, the process 1500 may be implemented by any suitable apparatus capable of supporting communication-related operations.

At block 1502, an apparatus (e.g., a TRP) determines duty cycling of transmissions by another apparatus (e.g., a second apparatus).

At block 1504, the apparatus determines the average transmit power based on the duty cycling of transmissions by the other apparatus determined at block 1502.

In some aspects, the process 1500 may include any combination of the above operations.

Eleventh Example Process

Figure 16:
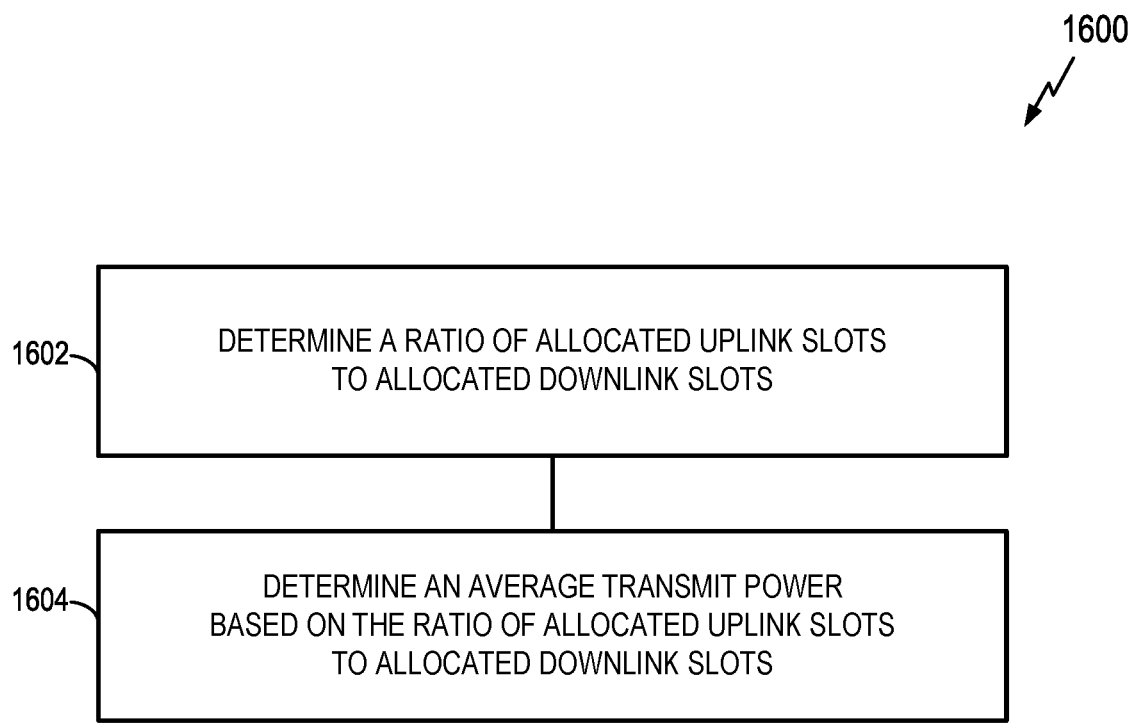
FIG. 16 is a flowchart illustrating an example of a process for determining an average transmit power based on a ratio of allocated uplink slots in accordance with some aspects of the disclosure.

FIG. 16 illustrates a process 1600 for communication in accordance with some aspects of the disclosure. One or more aspects of the process 1600 may be used in conjunction with (e.g., in addition to or as part of) the process 1400 of FIG. 14. The process 1600 may take place within a processing circuit (e.g., the processing circuit 1310 of FIG. 13), which may be located in a TRP, a BS, an eNB, a gNB, a UE, a CPE, or some other suitable apparatus. Of course, in various aspects within the scope of the disclosure, the process 1600 may be implemented by any suitable apparatus capable of supporting communication-related operations.

At block 1602, an apparatus (e.g., a TRP) determines a ratio of allocated uplink slots to allocated downlink slots.

At block 1604, the apparatus determines the average transmit power based on the ratio of allocated uplink slots to allocated downlink slots determined at block 1602.

In some aspects, the process 1600 may include any combination of the above operations.

Twelfth Example Process

Figure 17:
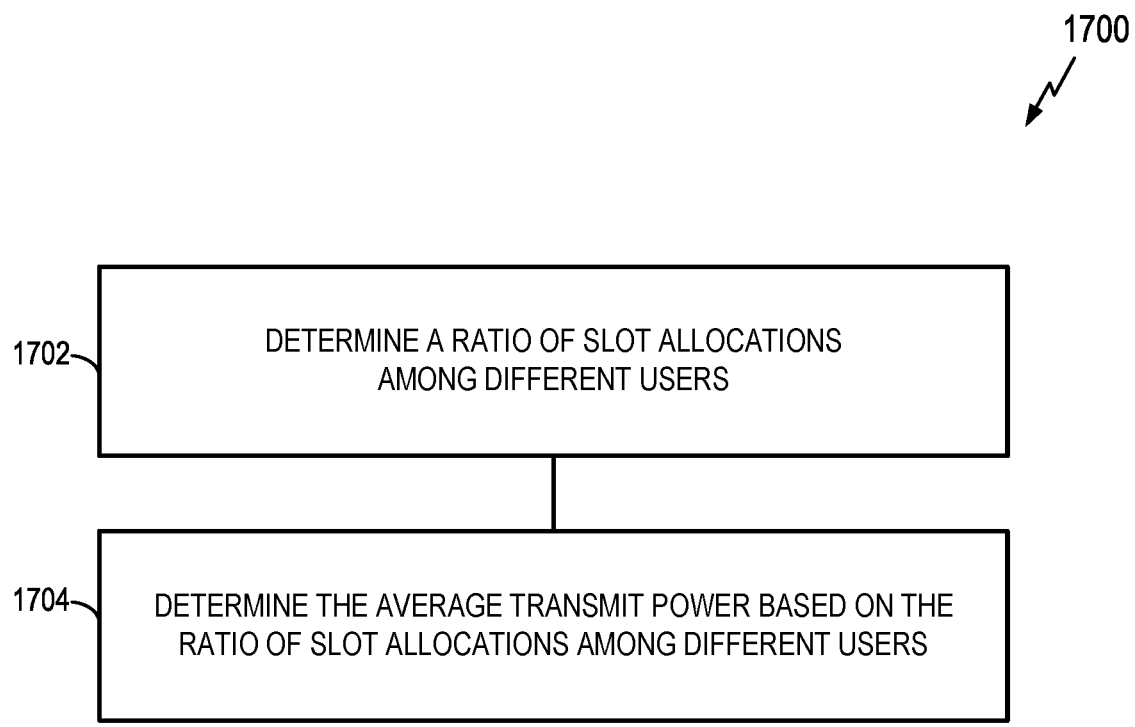
FIG. 17 is a flowchart illustrating an example of a process for determining an average transmit power based on a ratio of slot allocations in accordance with some aspects of the disclosure.

FIG. 17 illustrates a process 1700 for communication in accordance with some aspects of the disclosure. One or more aspects of the process 1700 may be used in conjunction with (e.g., in addition to or as part of) the process 1400 of FIG. 14. The process 1700 may take place within a processing circuit (e.g., the processing circuit 1310 of FIG. 13), which may be located in a TRP, a BS, an eNB, a gNB, a UE, a CPE, or some other suitable apparatus. Of course, in various aspects within the scope of the disclosure, the process 1700 may be implemented by any suitable apparatus capable of supporting communication-related operations.

At block 1702, an apparatus (e.g., a TRP) determines a ratio of slot allocations among different users.

At block 1704, the apparatus determines the average transmit power based on the ratio of slot allocations among different users determined at block 1702.

In some aspects, the process 1700 may include any combination of the above operations.

Thirteenth Example Process

Figure 18:
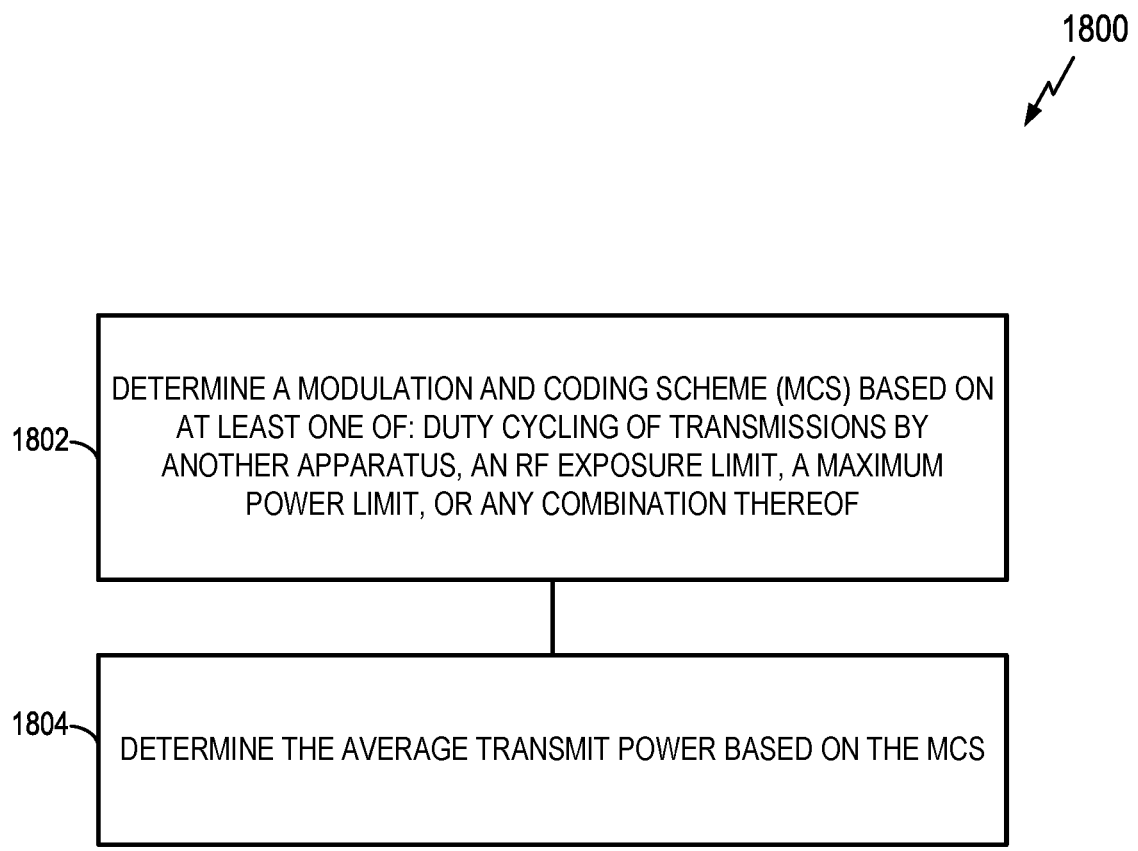
FIG. 18 is a flowchart illustrating an example of a process for determining an average transmit power based on a modulation and coding scheme in accordance with some aspects of the disclosure.

FIG. 18 illustrates a process 1800 for communication in accordance with some aspects of the disclosure. One or more aspects of the process 1800 may be used in conjunction with (e.g., in addition to or as part of) the process 1400 of FIG. 14. The process 1800 may take place within a processing circuit (e.g., the processing circuit 1310 of FIG. 13), which may be located in a TRP, a BS, an eNB, a gNB, a UE, a CPE, or some other suitable apparatus. Of course, in various aspects within the scope of the disclosure, the process 1800 may be implemented by any suitable apparatus capable of supporting communication-related operations.

At block 1802, an apparatus (e.g., a TRP) determines a modulation and coding scheme (MCS) based on at least one of: duty cycling of transmissions by another apparatus (e.g., a second apparatus), an RF exposure limit, a maximum power limit, or any combination thereof.

At block 1804, the apparatus determines the average transmit power based on the MCS determined at block 1802.

In some aspects, the process 1800 may include any combination of the above operations.

Fourteenth Example Process

Figure 19:
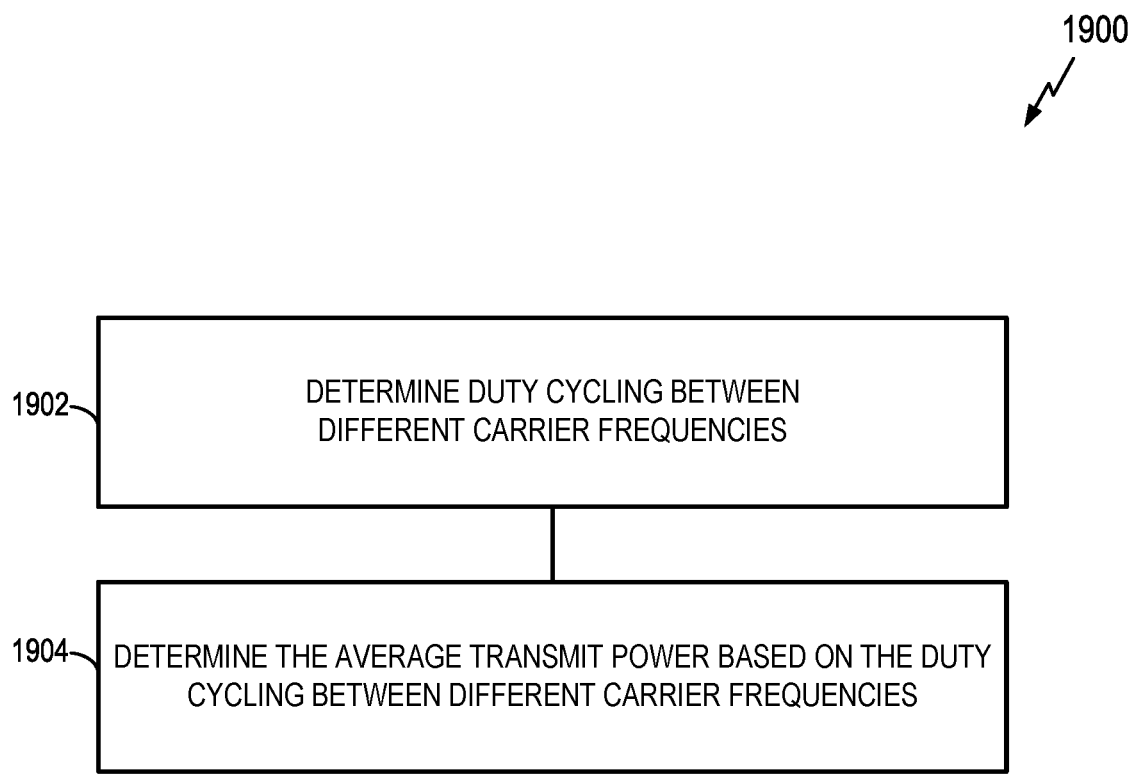
FIG. 19 is a flowchart illustrating an example of a process for determining an average transmit power based on duty cycling in accordance with some aspects of the disclosure.

FIG. 19 illustrates a process 1900 for communication in accordance with some aspects of the disclosure. One or more aspects of the process 1900 may be used in conjunction with (e.g., in addition to or as part of) the process 1400 of FIG. 14. The process 1900 may take place within a processing circuit (e.g., the processing circuit 1310 of FIG. 13), which may be located in a TRP, a BS, an eNB, a gNB, a UE, a CPE, or some other suitable apparatus. Of course, in various aspects within the scope of the disclosure, the process 1900 may be implemented by any suitable apparatus capable of supporting communication-related operations.

At block 1902, an apparatus (e.g., a TRP) determines duty cycling between different carrier frequencies.

At block 1904, the apparatus determines the average transmit power based on the duty cycling between different carrier frequencies determined at block 1902.

In some aspects, the process 1900 may include any combination of the above operations.

Fifteenth Example Process

Figure 20:
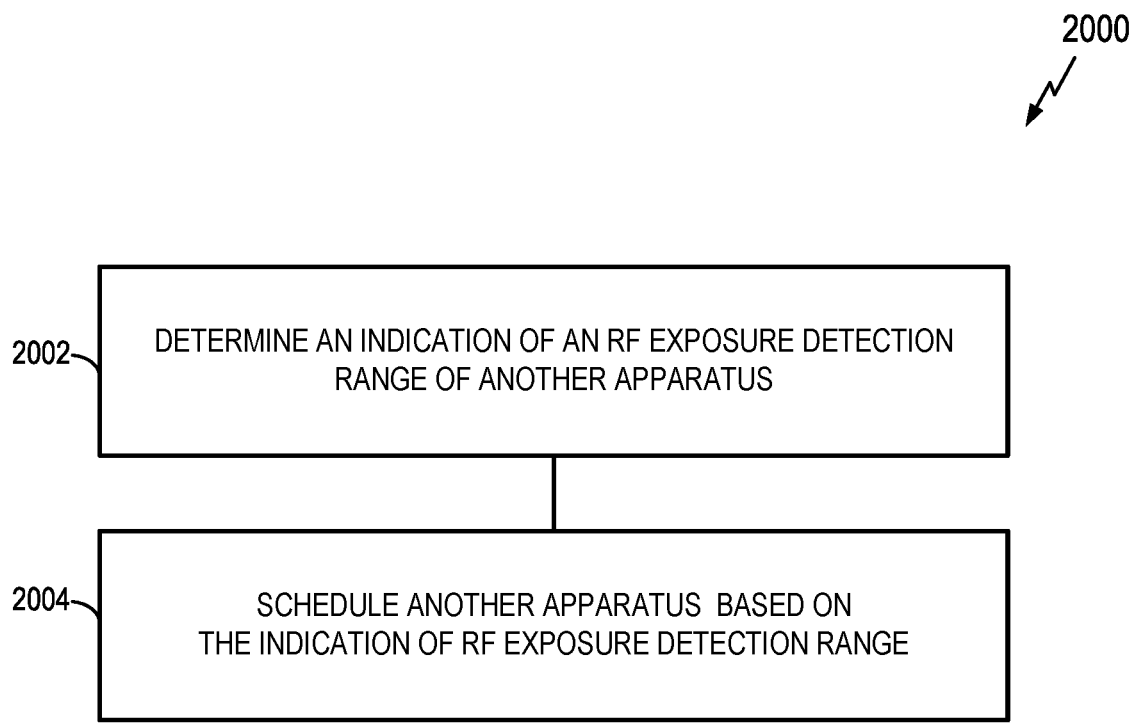
FIG. 20 is a flowchart illustrating an example of another scheduling process in accordance with some aspects of the disclosure.

FIG. 20 illustrates a process 2000 for communication in accordance with some aspects of the disclosure. One or more aspects of the process 2000 may be used in conjunction with (e.g., in addition to or as part of) the process 1400 of FIG. 14. The process 2000 may take place within a processing circuit (e.g., the processing circuit 1310 of FIG. 13), which may be located in a TRP, a BS, an eNB, a gNB, a UE, a CPE, or some other suitable apparatus. Of course, in various aspects within the scope of the disclosure, the process 2000 may be implemented by any suitable apparatus capable of supporting communication-related operations.

At block 2002, an apparatus (e.g., a TRP) determines an indication of an RF exposure detection range of another apparatus (e.g., a second apparatus).

At block 2004, the apparatus schedules the other apparatus based on the indication of RF exposure detection range determined at block 2002. Thus, the scheduling of block 1402 of FIG. 14 may take the detection range into account.

In some aspects, the process 2000 may include any combination of the above operations.

Sixteenth Example Process

Figure 21:
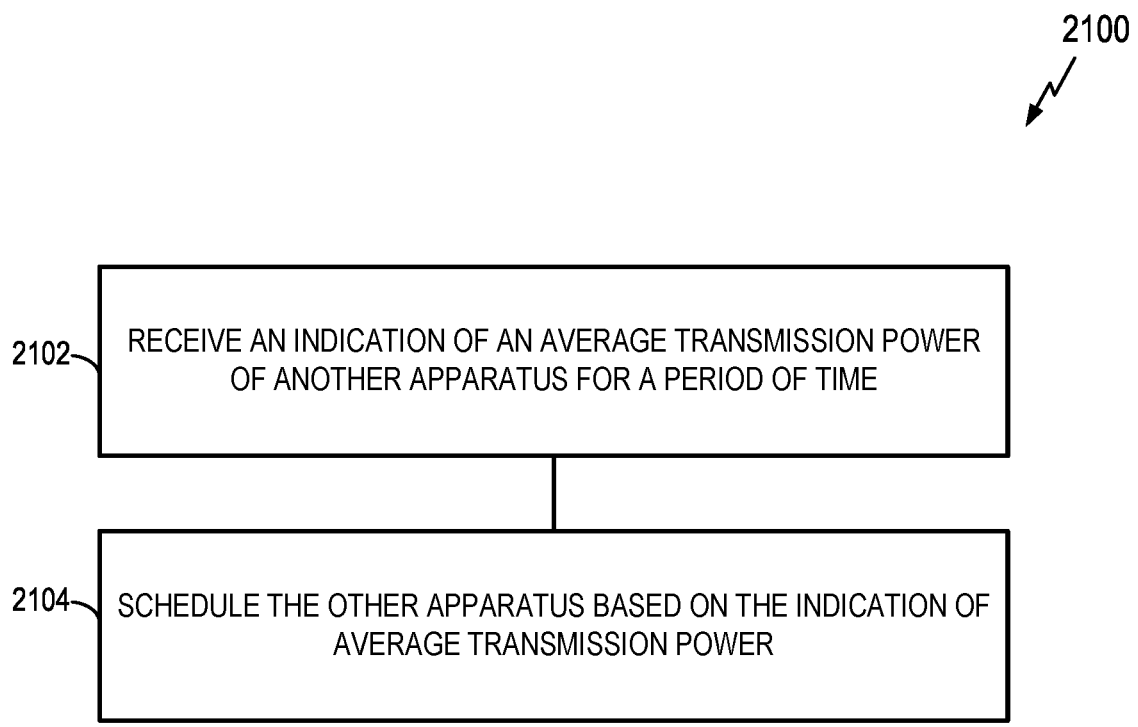
FIG. 21 is a flowchart illustrating an example of another scheduling process in accordance with some aspects of the disclosure.

FIG. 21 illustrates a process 2100 for communication in accordance with some aspects of the disclosure. One or more aspects of the process 2100 may be used in conjunction with (e.g., in addition to or as part of) the process 1400 of FIG. 14. The process 2100 may take place within a processing circuit (e.g., the processing circuit 1310 of FIG. 13), which may be located in a TRP, a BS, an eNB, a gNB, a UE, a CPE, or some other suitable apparatus. Of course, in various aspects within the scope of the disclosure, the process 2100 may be implemented by any suitable apparatus capable of supporting communication-related operations.

At block 2102, an apparatus (e.g., a TRP) receives an indication of an average transmission power of another apparatus (e.g., a second apparatus) for a period of time.

At block 2104, the apparatus schedules the other apparatus based on the indication of average transmission power determined at block 2002. Thus, the scheduling of block 1402 of FIG. 14 may take the average transmission power into account.

In some aspects, the process 2100 may include any combination of the above operations.

Seventeenth Example Process

Figure 22:
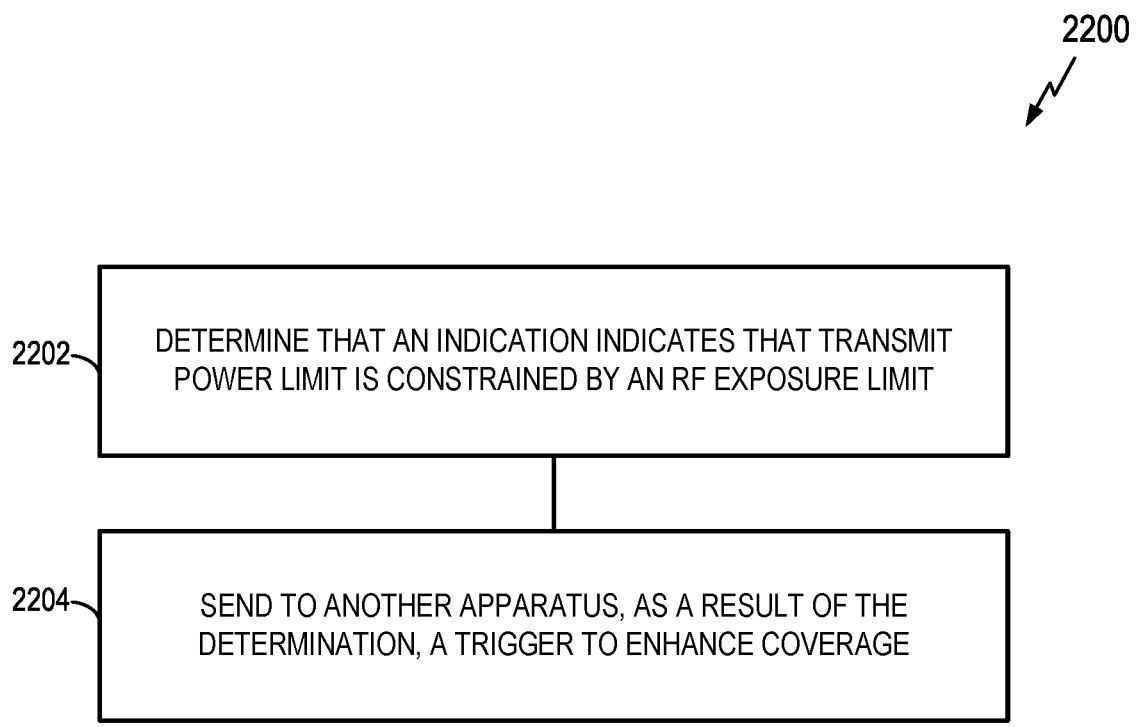
FIG. 22 is a flowchart illustrating an example of a trigger process in accordance with some aspects of the disclosure.

FIG. 22 illustrates a process 2200 for communication in accordance with some aspects of the disclosure. One or more aspects of the process 2200 may be used in conjunction with (e.g., in addition to or as part of) the process 1400 of FIG. 14. The process 2200 may take place within a processing circuit (e.g., the processing circuit 1310 of FIG. 13), which may be located in a TRP, a BS, an eNB, a gNB, a UE, a CPE, or some other suitable apparatus. Of course, in various aspects within the scope of the disclosure, the process 2200 may be implemented by any suitable apparatus capable of supporting communication-related operations.

At block 2202, an apparatus (e.g., a TRP) determines that an indication indicates that transmit power limit is constrained by an RF exposure limit.

At block 2204, as a result of the determination of block 2202, the apparatus sends to another apparatus (e.g., a second apparatus) a trigger to enhance coverage.

In some aspects, the process 2200 may include any combination of the above operations.

Additional Aspects

The examples set forth herein are provided to illustrate certain concepts of the disclosure. Those of ordinary skill in the art will comprehend that these are merely illustrative in nature, and other examples may fall within the scope of the disclosure and the appended claims. Based on the teachings herein those skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

As those skilled in the art will readily appreciate, various aspects described throughout this disclosure may be extended to any suitable telecommunication system, network architecture, and communication standard. By way of example, various aspects may be applied to wide area networks, peer-to-peer network, local area network, other suitable systems, or any combination thereof, including those described by yet-to-be defined standards.

Many aspects are described in terms of sequences of actions to be performed by, for example, elements of a computing device. It will be recognized that various actions described herein can be performed by specific circuits, for example, central processing units (CPUs), graphic processing units (GPUs), digital signal processors (DSPs), application specific integrated circuits (ASICs), field programmable gate arrays (FPGAs), or various other types of general purpose or special purpose processors or circuits, by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

One or more of the components, steps, features and/or functions illustrated in above may be rearranged and/or combined into a single component, step, feature or function or embodied in several components, steps, or functions. Additional elements, components, steps, and/or functions may also be added without departing from novel features disclosed herein. The apparatus, devices, and/or components illustrated above may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An example of a storage medium is coupled to the processor such that the processor can read information from, and write information to, the storage medium. In the alternative, the storage medium may be integral to the processor.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage or mode of operation.

The terminology used herein is for the purpose of describing particular aspects only and is not intended to be limiting of the aspects. As used herein, the singular forms "a," "an" and "the" are intended to include the plural forms as well, unless the context clearly indicates otherwise. It will be further understood that the terms "comprises," "comprising," "includes" or "including," when used herein, specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "/" between two adjacent words has the same meaning as "or" unless expressly stated otherwise. Moreover, phrases such as "connected to," "coupled to" or "in communication with" are not limited to direct connections unless expressly stated otherwise.

Any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be used there or that the first element must precede the second element in some manner. Also, unless stated otherwise a set of elements may include one or more elements. In addition, terminology of the form "at least one of a, b, or c" or "a, b, c, or any combination thereof" used in the description or the claims means "a or b or c or any combination of these elements." For example, this terminology may include a, or b, or c, or a and b, or a and c, or a and b and c, or 2a, or 2b, or 2c, or 2a and b, and so on.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

While the foregoing disclosure shows illustrative aspects, it should be noted that various changes and modifications could be made herein without departing from the scope of the appended claims. The functions, steps or actions of the method claims in accordance with aspects described herein need not be performed in any particular order unless expressly stated otherwise. Furthermore, although elements may be described or claimed in the singular, the plural is contemplated unless limitation to the singular is explicitly stated.

What is claimed is:

1. A method of communication at a first apparatus, comprising:
   determining a radio frequency (RF) exposure limit corresponding to a beam configuration for the first apparatus;
   determining a power headroom limit for the first apparatus based on the RF exposure limit corresponding to the beam configuration for the first apparatus;
   generating a first indication that the power headroom limit is constrained by the RF exposure limit;
   generating a second indication of an RF exposure detection range value of the first apparatus;
   sending the power headroom limit, the first indication, and the second indication to a second apparatus;
   receiving a schedule based on the power headroom limit, the first indication, and the second indication from the second apparatus, wherein the schedule specifies a fraction of time the first apparatus is to transmit to meet the RF exposure limit; and
   communicating with the second apparatus according to the schedule.

2. The method of claim 1, wherein the RF exposure limit comprises:
   a maximum permissible exposure regulatory limit; or
   a maximum permissible exposure regulatory limit and a specific absorption rate regulatory limit.

3. The method of claim 1, wherein the determining the power headroom limit is further based on the RF exposure detection range value of the first apparatus.

4. The method of claim 1, wherein the first indication further indicates whether the power headroom limit is constrained by a maximum power headroom limit.

5. The method of claim 1, wherein:
   the first apparatus comprises a plurality of antenna sub-arrays; and
   the power headroom limit is for a particular sub-array of the plurality of antenna sub-arrays.

6. The method of claim 1, wherein:
   the first apparatus is configured to use a plurality of beams; and
   the power headroom limit is for a particular beam of the plurality of beams.

7. The method of claim 1, further comprising:
   determining an average transmit power of the first apparatus; and
   sending an indication of the average transmit power to the second apparatus.

8. The method of claim 1, further comprising:
   determining an average transmit power of the first apparatus,
   wherein the determining the power headroom limit is further based on the average transmit power.

9. The method of claim 1, wherein the first apparatus is configured to use a plurality of beam configurations, the method further comprising:
   determining, for each of the plurality of beam configurations, a corresponding RF exposure constraint for the beam configuration; and
   selecting one of the beam configurations for communication based on the corresponding RF exposure constraints.

10. The method of claim 1, further comprising:
    determining the RF exposure detection range value of the first apparatus;
    determining an effective isotropic radiated power (EIRP) limit for the first apparatus based on the RF exposure detection range value; and
    sending a third indication of the EIRP limit to the second apparatus.

11. The method of claim 1, further comprising:
    receiving an indication of Additional Maximum Power Reduction (A-MPR),
    wherein the determination of the power headroom limit is further based on the indication of A-MPR.

12. The method of claim 11, further comprising:
    receiving, in conjunction with the indication of A-MPR, a trigger to maintain coverage while reducing peak power,
    wherein the maintaining of coverage while reducing peak power comprises: increasing a length of repetitions, decreasing a size of allocations, increasing a length of hybrid automatic repeat requests (HARQs), increasing a length of demodulation reference signals (DMRSs), or any combination thereof.

13. The method of claim 1, wherein the determining the RF exposure limit corresponding to the beam configuration for the first apparatus comprises:
    determining an extent to which the beam configuration for the first apparatus impacts an object subject to radio frequency (RF) exposure protection.

14. An apparatus for communication, comprising:
    a memory device; and
    a processing circuit coupled to the memory device and configured to:
       determine a radio frequency (RF) exposure limit corresponding to a beam configuration for the apparatus;
       determine a power headroom limit for the apparatus based on the RF exposure limit corresponding to the beam configuration for the apparatus;
       generate a first indication that the power headroom limit is constrained by the RF exposure limit;
       generate a second indication of an RF exposure detection range value of the first apparatus;
       send the power headroom limit, the first indication, and the second indication to another apparatus;
       receive a schedule based on the power headroom limit, the first indication, and the second indication from the other apparatus, wherein the schedule specifies a fraction of time the apparatus is to transmit to meet the RF exposure limit; and
       communicate with the other apparatus according to the schedule.

15. A method of communication at a first apparatus, comprising:
    receiving a power headroom limit for a second apparatus, a first indication of whether the power headroom limit is constrained by a radio frequency (RF) exposure limit corresponding to a beam configuration for the second apparatus, and a second indication of an RF exposure detection range value of the second apparatus;

generating a schedule based on the power headroom limit, the first indication, and the second indication, wherein the schedule specifies a fraction of time the second apparatus is to transmit to meet the RF exposure limit; and sending the schedule to the second apparatus.

16. The method of claim 15, wherein the generating the schedule comprises:
determining that the first indication indicates that the power headroom limit is constrained by the RF exposure limit; and
as a result of the determining that the indication indicates that the power headroom limit is constrained by the RF exposure limit, scheduling the second apparatus based on an average transmit power for the second apparatus over a period of time.

17. The method of claim 16, further comprising:
determining the average transmit power based on duty cycling of transmissions by the second apparatus.

18. The method of claim 16, further comprising:
determining the average transmit power based on a ratio of allocated uplink slots to allocated downlink slots.

19. The method of claim 16, further comprising:
determining the average transmit power based on a ratio of slot allocations among different users.

20. The method of claim 16, further comprising:
determining a modulation and coding scheme (MCS) based on at least one of: duty cycling of transmissions by the second apparatus, the RF exposure limit, a maximum power limit, or any combination thereof; and
determining the average transmit power based on the MCS.

21. The method of claim 16, further comprising:
determining the average transmit power based on duty cycling between different carrier frequencies.

22. The method of claim 15, further comprising:
receiving an indication of an average transmission power of the second apparatus for a period of time,
wherein the generating the schedule is further based on the indication of average transmission power.

23. The method of claim 15, wherein:
the second apparatus comprises a plurality of antenna sub-arrays; and
the power headroom limit is for a particular sub-array of the plurality of antenna sub-arrays.

24. The method of claim 15, wherein:
the second apparatus is configured to use a plurality of beams; and
the power headroom limit is for a particular beam of the plurality of beams.

25. The method of claim 15, wherein the generating the schedule comprises:
determining that the indication indicates that the power headroom limit is constrained by the RF exposure limit; and
sending an indication of Additional Maximum Power Reduction (A-MPR) to the second apparatus as a result of the determination.

26. The method of claim 25, further comprising:
sending to the second apparatus, as a result of the determination, a trigger to enhance coverage,
wherein the enhancement of coverage comprises: increasing a length of repetitions, decreasing a size of allocations, increasing a length of hybrid automatic repeat requests (HARQs), increasing a length of demodulation reference signals (DMRSs), or any combination thereof.

27. The method of claim 15, wherein the RF exposure detection range value comprises an RF exposure detection range capability value.

28. An apparatus for communication, comprising:
a memory device; and
a processing circuit coupled to the memory device and configured to:
receive a power headroom limit for another apparatus, a first indication of whether the power headroom limit is constrained by a radio frequency (RF) exposure limit corresponding to a beam configuration for the other apparatus, and a second indication of an RF exposure detection range value of the other apparatus;
generate a schedule based on the power headroom limit, the first indication, and the second indication, wherein the schedule specifies a fraction of time the other apparatus is to transmit to meet the RF exposure limit; and
send the schedule to the other apparatus.

* * * * *